(12) United States Patent
Flynn, IV et al.

(10) Patent No.: US 11,882,195 B2
(45) Date of Patent: Jan. 23, 2024

(54) SYSTEMS AND METHODS FOR ENABLING ACCESS TO THIRD PARTY SERVICES VIA A SERVICE LAYER

(71) Applicant: Convida Wireless, LLC, Wilmington, DE (US)

(72) Inventors: William Robert Flynn, IV, Schwenksville, PA (US); Dale N. Seed, Allentown, PA (US); Xu Li, Plainsboro, NJ (US); Guang Lu, Thornhill (CA); Lijun Dong, San Diego, CA (US); Hongkun Li, Malvern, PA (US); Phillip Brown, Los Angeles, CA (US); Catalina M. Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 18/167,472

(22) Filed: Feb. 10, 2023

(65) Prior Publication Data

US 2023/0199079 A1   Jun. 22, 2023

Related U.S. Application Data

(63) Continuation of application No. 17/573,695, filed on Jan. 12, 2022, now Pat. No. 11,616,851, which is a
(Continued)

(51) Int. Cl.
H04L 67/51 (2022.01)
H04W 4/70 (2018.01)
(Continued)

(52) U.S. Cl.
CPC ............ H04L 67/51 (2022.05); H04L 67/125 (2013.01); H04L 67/53 (2022.05); H04W 4/70 (2018.02)

(58) Field of Classification Search
CPC ....... H04L 67/51; H04L 67/53; H04L 67/125; H04W 4/70
See application file for complete search history.

(56) References Cited

U.S. PATENT DOCUMENTS

| 8,608,067 B2 | 12/2013 | Miyachi et al. |
| 10,171,286 B2 | 1/2019 | Seed et al. |

(Continued)

FOREIGN PATENT DOCUMENTS

| CN | 102479202 A | 5/2012 |
| JP | 2004-054791 A | 2/2004 |

(Continued)

OTHER PUBLICATIONS

ARIB/TTC cosponsorship seminar M2M standardization newest trend-oneM2M technical specification (first edition) Sep. 7, 2014, pp. 1-21.
(Continued)

Primary Examiner — Suraj M Joshi
(74) Attorney, Agent, or Firm — BakerHostetler

(57) ABSTRACT

An M2M Service Layer is expanded to access the services of third parties and exchange data with these third parties. The M2M Service Layer is then able to act as a proxy between M2M Devices and the third party services. The M2M Service Layer is able to present a single/consistent interface, or API, to the M2M Device and hide the details of the third party service provider from the M2M Device.

18 Claims, 21 Drawing Sheets

Related U.S. Application Data continuation of application No. 17/153,992, filed on Jan. 21, 2021, now Pat. No. 11,240,321, which is a continuation of application No. 15/511,794, filed as application No. PCT/US2015/050667 on Sep. 17, 2015, now Pat. No. 10,931,762.

(60) Provisional application No. 62/051,561, filed on Sep. 17, 2014.

(51) Int. Cl.
*H04L 67/53* (2022.01)
*H04L 67/125* (2022.01)

(56) References Cited

U.S. PATENT DOCUMENTS

| | | | |
|---|---|---|---|
| 11,240,321 | B2 | 2/2022 | Flynn, IV et al. |
| 2004/0006651 | A1 | 1/2004 | Dani et al. |
| 2006/0167968 | A1 | 7/2006 | Reynolds et al. |
| 2009/0257080 | A1* | 10/2009 | Herrmann ............ G06F 9/4411 358/1.15 |
| 2011/0213871 | A1 | 9/2011 | Digirolamo et al. |
| 2011/0240736 | A1 | 10/2011 | Miyachi et al. |
| 2013/0188515 | A1 | 7/2013 | Pinheiro et al. |
| 2014/0086143 | A1* | 3/2014 | Foti .................... H04W 4/70 370/328 |
| 2014/0126581 | A1 | 5/2014 | Wang et al. |
| 2014/0189001 | A1 | 7/2014 | Tyagi et al. |
| 2014/0233473 | A1 | 8/2014 | Lu et al. |
| 2016/0014674 | A1* | 1/2016 | Ahn .................... H04W 4/70 455/456.1 |

FOREIGN PATENT DOCUMENTS

| | | |
|---|---|---|
| JP | 2006-523905 A | 10/2006 |
| JP | 2013-521709 | 6/2013 |
| JP | 2013-522965 A | 6/2013 |
| JP | 2014-506764 A | 3/2014 |
| JP | 2014-512729 A | 5/2014 |
| WO | 2009/126212 A1 | 10/2009 |
| WO | 2012/150778 A2 | 11/2012 |
| WO | 2014/117039 A1 | 7/2014 |
| WO | 2014/129802 A1 | 8/2014 |

OTHER PUBLICATIONS

English Translation of JP Office Action dated Jul. 3, 2018 for JP Application 2017514864.
European Telecommunications Standards Institute (ETSI), TS 102 690 V2.1.1, Technical Specification, Machine-to-Machine Communications (M2M); Functional Architecture, Oct. 2013, 332 pages.
International Patent Application No. PCT/US2015/050667: International Search Report and the Written Opinion dated Dec. 14, 2015, 10 pages.
OneM2M "oneM2M Functional Architecture Baseline Draft", TS-0001 V 0.4.2, Mar. 2014, 302 pages.
OneM2M "Service Component Architecture", TS-0007-Service_Component_Architecture-V0_1_0, OneM2M Technical Specification Feb. 22, 2014, 17 pages.
W3C "Web Services Architecture", W3C Working Group Note, Feb. 11, 2004, 91 pages.
W3C "Web Services Description Language (WSDL) 1.1", W3C Note, Mar. 15, 2001, 30 pages.
wwvv.wikipedia.org "List of Web Service Protocols" Oct. 19, 2016, 1 pages.
www.hivemq.com "HiveMQ—Enterprise MQTT Broker", 2017, 2 pages.
www.PunyPNG.com "PNG Compression and Image Optimization", 2 pages.
www.w3schools.com "XML Web Services", 1999-2017, 11 pages.
www.wikipedia.org "Service-oriented Architecture" Apr. 28, 2017, 10 pages.
U.S. Appl. No. 17/573,695, filed Jan. 12, 2022.
U.S. Appl. No. 17/153,992, filed Jan. 21, 2021.
U.S. Appl. No. 15/511,794, filed Mar. 16, 2017.

* cited by examiner

1402

Service Object

Search tags

Image compression PNG free description

```
<body>
<h1>punypng</h1>
<h2>
Image Compressor for Designers and Developers
<h2>
<h2>Supports JPG, GIF and PNG. </h2>
<h2>Go to PunyPNG.com to request an API Key </h2>
</body>
```

Description ×
Enter a description or additional information about the service your are providing

1404

Service Interface

| Message 1 | Message 2 | New Message |

Request:

http://www.punypng.com/api/optimize?img=image.png&key=API_KEY

Response

{"original_size":value, "optimized_size":value, "optimized_url":url, "group_id":null, "savings_percent":value, "savings_bytes":value}

Description ×
Enter the required request API and the expected response

1406

Advanced Service Search

Find compression image

Response

PunyPNG
openCompression
tinyFile

*FIG. 14*

SYSTEMS AND METHODS FOR ENABLING ACCESS TO THIRD PARTY SERVICES VIA A SERVICE LAYER

CROSS-REFERENCE TO RELATED APPLICATIONS

This application is a continuation of U.S. patent application Ser. No. 17/573,695, filed Jan. 12, 2022, which is a continuation of U.S. patent application Ser. No. 17/153,992 filed Jan. 21, 2021, now U.S. Pat. No. 11,240,321, which is a continuation of U.S. patent application Ser. No. 15/511, 794, filed Mar. 16, 2017, now U.S. Pat. No. 10,931,762, which is a National Stage Application filed under 35 U.S.C. § 371 of International Application No. PCT/US2015/050667, filed Sep. 17, 2015, which claims priority to U.S. Provisional Patent Application No. 62/051,561, filed Sep. 17, 2014, the disclosures of which are incorporated herein by reference in their entirety.

BACKGROUND

Web Service (WS) is a method of implementing a software system designed to support interoperable interactions between computers over a network. WS provides a standard means of interoperation between software applications running on a variety of platforms and frameworks. More precisely, WS is a specific implementation technology of Remote Procedure Call (RPC), which is a software operation paradigm where one program can request a service from another program located in a different computer in a network. WSs are characterized by their great interoperability and extensibility, as well as their machine-readable descriptions, thanks to the use of Extensible Markup Language (XML). WSs can be combined in a loosely coupled way to achieve complex operations such that programs providing simple services can interact with each other to deliver sophisticated value-added services.

From a protocol stack perspective, Service Layers are typically layered on top of existing network protocol stacks and provide value added services to client applications. Hence Service Layers are often categorized as 'middleware' services. For example, FIG. 1 is a diagram that illustrates an exemplary Service Layer 102 layered in between an IP networking stack 104 and applications 106.

FIG. 2 is a diagram that illustrates an example deployment scenario of a Service Layer instances within a network. In this example, the Service Layer instances are shown deployed on various network nodes (gateways and servers) and providing value-added services to network applications, device applications as well as to the network nodes themselves.

An Machine to Machine (M2M)/Internet of Things (IOT) Service Layer is an example of one type of Service Layer specifically targeted towards providing value-added services for M2M/IoT type devices and applications. Recently, several industry standards bodies (e.g. ETSI M2M, oneM2M) have been developing M2M/IoT Service Layers to address the challenges associated with integration of M2M/IoT types of devices and applications into deployments such as the Internet/Web, cellular, enterprise, and home network.

An M2M Service Layer can provide applications and devices access to a collection of M2M centric capabilities supported by the Service Layer. A few examples include security, charging, data management, device management, discovery, provisioning, and connectivity management. These capabilities are made available to applications via APIs which make use of message formats, resource structures and resource representations defined by the M2M Service Layer.

Another example of a Service Layer is the IP Multimedia Subsystem (IMS) Service Layer specifically targeted to providing multimedia services for mobile network devices.

The purpose and goal of oneM2M is to develop technical specifications which address the need for a common M2M Service Layer that can be readily embedded within various hardware and software, and relied upon to connect a wide variety of devices in the field with M2M application servers worldwide.

FIG. 3 is a diagram that illustrates the overall architecture of the oneM2M Service Layer 300. The oneM2M common services layer supports a set of Common Service Functions (CSFs) (i.e. service capabilities). An instantiation of a set of one or more particular types of CSFs is referred to as a Common Services Entity (CSE) 302 and 304 which can be hosted on different types of network nodes (e.g. infrastructure node, middle node, application-specific node).

Per the oneM2M RESTful architecture, CSFs are represented as a set of "resources". A resource is a uniquely addressable entity in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information about the resource.

FIG. 4 is a diagram that illustrates an M2M Service Architecture 400 that augments the oneM2M Functional Architecture by specifying M2M Services provided to M2M Application and M2M Service Providers. The Service Exposure Component 402 exposes services to Application Entities (AEs) 404. The Network Service Utilization Component 406 consumes services from the Network Service Entity (NSE) 408. The Remote Service Exposure component 410 connects Services from different M2M environments.

SUMMARY

An M2M Service Layer is expanded to access the services of third parties and exchange data with these third parties. The M2M Service Layer is then able to act as a proxy between M2M Devices and the third party services. The M2M Service Layer is able to present a single/consistent interface, or API, to the M2M Device and hide the details of the third party service provider from the M2M Device.

By allowing devices to access more services and exchange data with more platforms, application and device developers are presented with more possibilities in terms of what can be built with the internet of things. In other words, more information exchange will be possible, devices will be able to access more services, and a wider range of services can be created.

The methods described can also be applied to service layers that are not specific to machine-to-machine communication or the internet of things.

Methods for M2M Service Layers to integrate value added services from Third Party Service Providers are used through a proxy mechanism such that the M2M Service Layer clients do not need to know how to communicate with the Third Party Service.

The Third Party Service API can be specified, defined or provided to the M2M Service Layer.

Service Layer clients can discover the Third Party Services available through the M2M Service Layer. It is not necessary that the Service Layer clients be made aware that these services are external to the host M2M Service Layer.

The Service Layer clients can request access to, register for access to, or be provisioned for access to the Third Party Services.

The Third Party Service can access the Service Layer in a manner consistent with the native protocol of the M2M Service Layer.

An M2M based Interface can be translated into the Third Party API, proxying the request to the Third Party Service, receiving the response from the Third Party Service, and sending a native response to the originator of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 14 is a diagram of a Graphical User Interface of one embodiment.

DETAILED DESCRIPTION OF ILLUSTRATIVE EMBODIMENTS

M2M Service Layers are being deployed with a requirement to support devices or sensors that may be constrained and applications that may have limits with respect to data rates, data consumption limits and computational complexities. Due to their constrained nature these Service Layer clients will need to perform as much processing as possible external to the device or application. Clients will often rely on the service layer to perform processing. The M2M Service Layer may support some value added processing services natively; however in general the M2M Service Layer is not likely to be able to support all possible application specific services or functionalities that can be needed or desired by deployed devices, sensors and applications. In the case where the M2M Service Layer does not natively support the desired service or functionality, the Service Layer clients need to implement those features themselves or request those services from Third Party Services.

Figure 1:
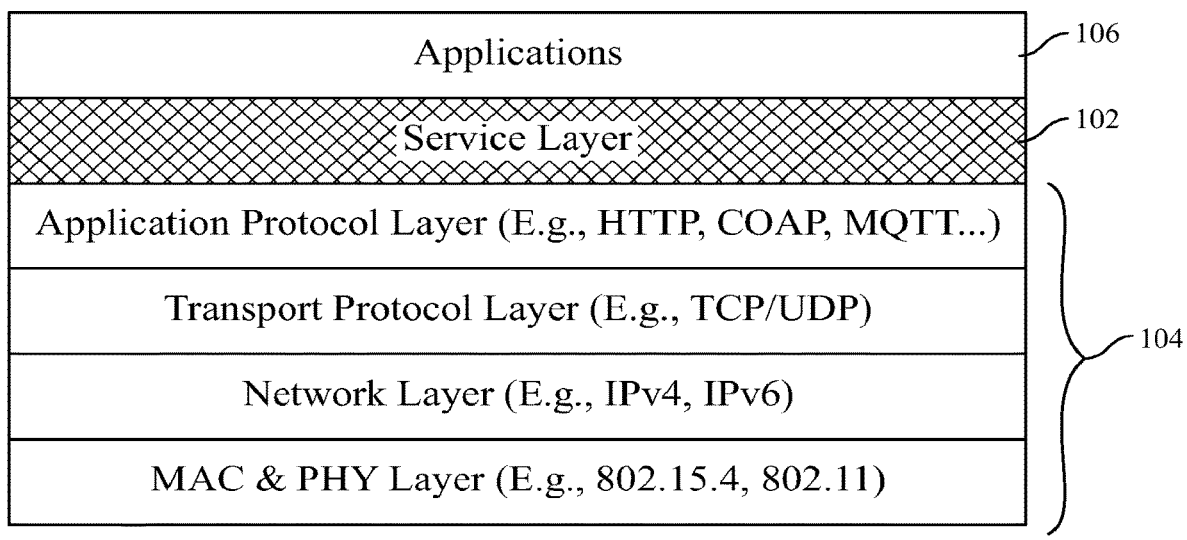
FIG. 1 is a diagram that illustrates an exemplary Service Layer layered in between an IP networking stack and applications.
Figure 2:
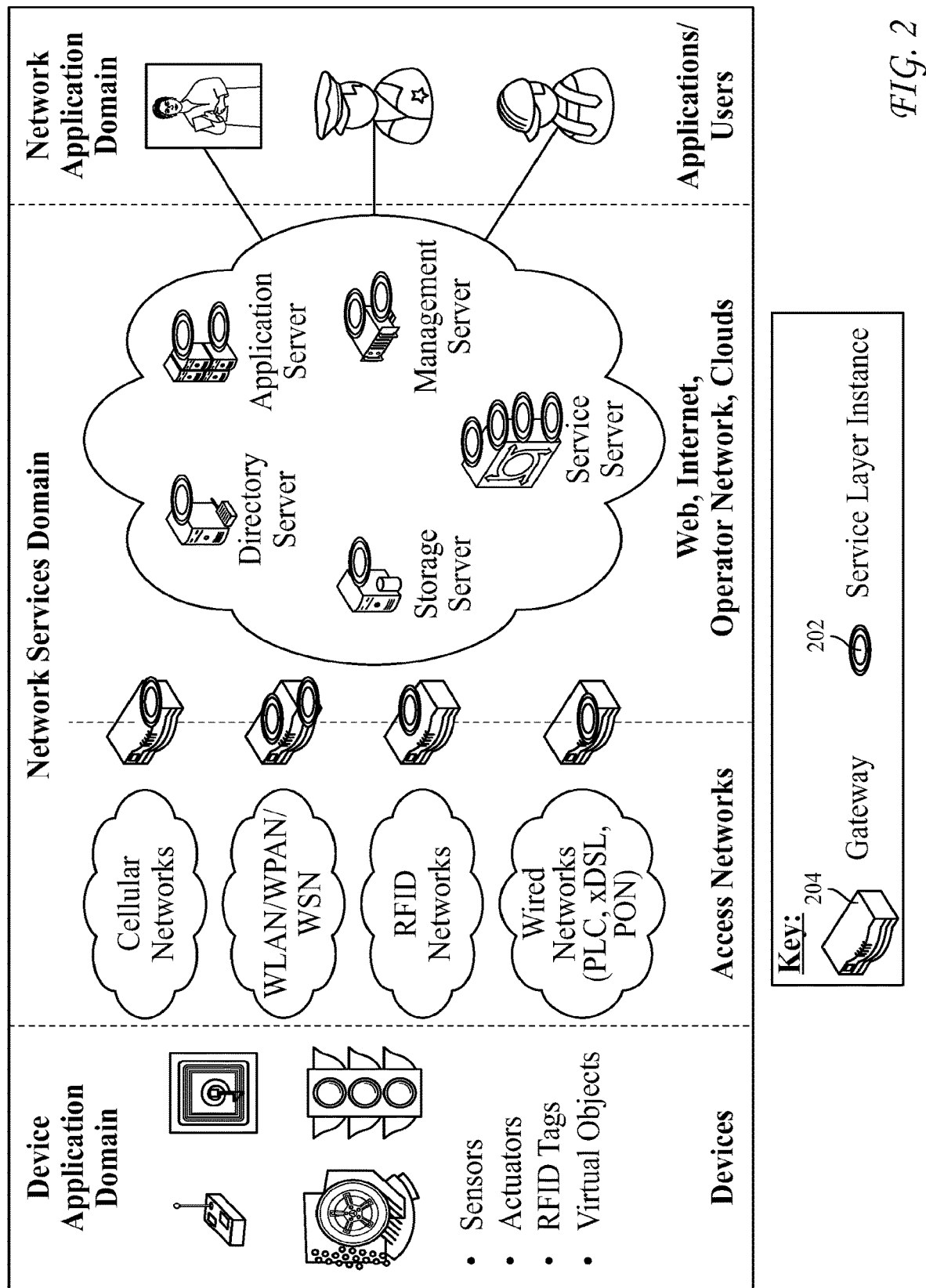
FIG. 2 is a diagram that illustrates an example deployment scenario of a Service Layer instances within a network.
Figure 3:
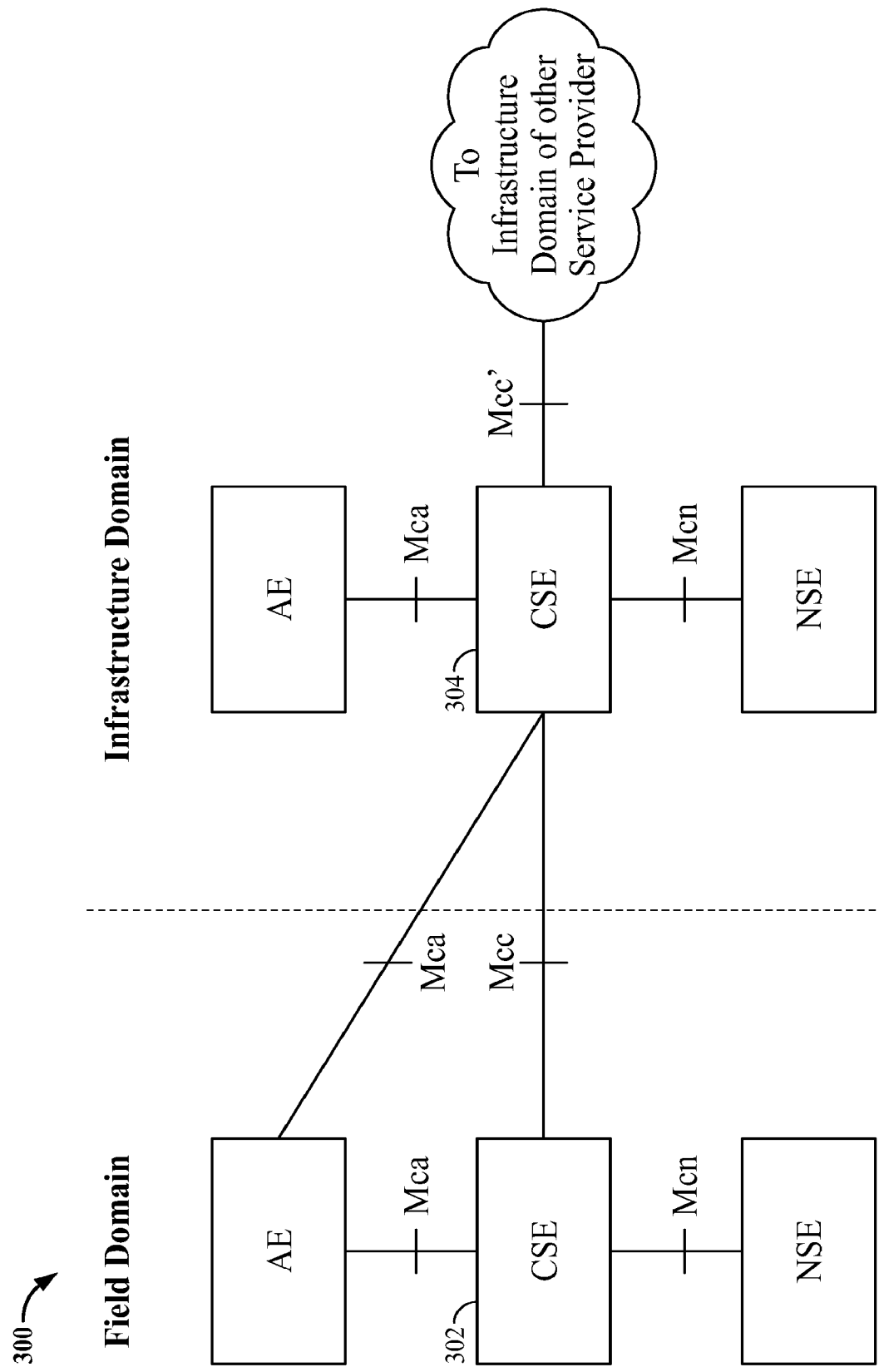
FIG. 3 is a diagram that illustrates the overall architecture of the oneM2M Service Layer.
Figure 4:
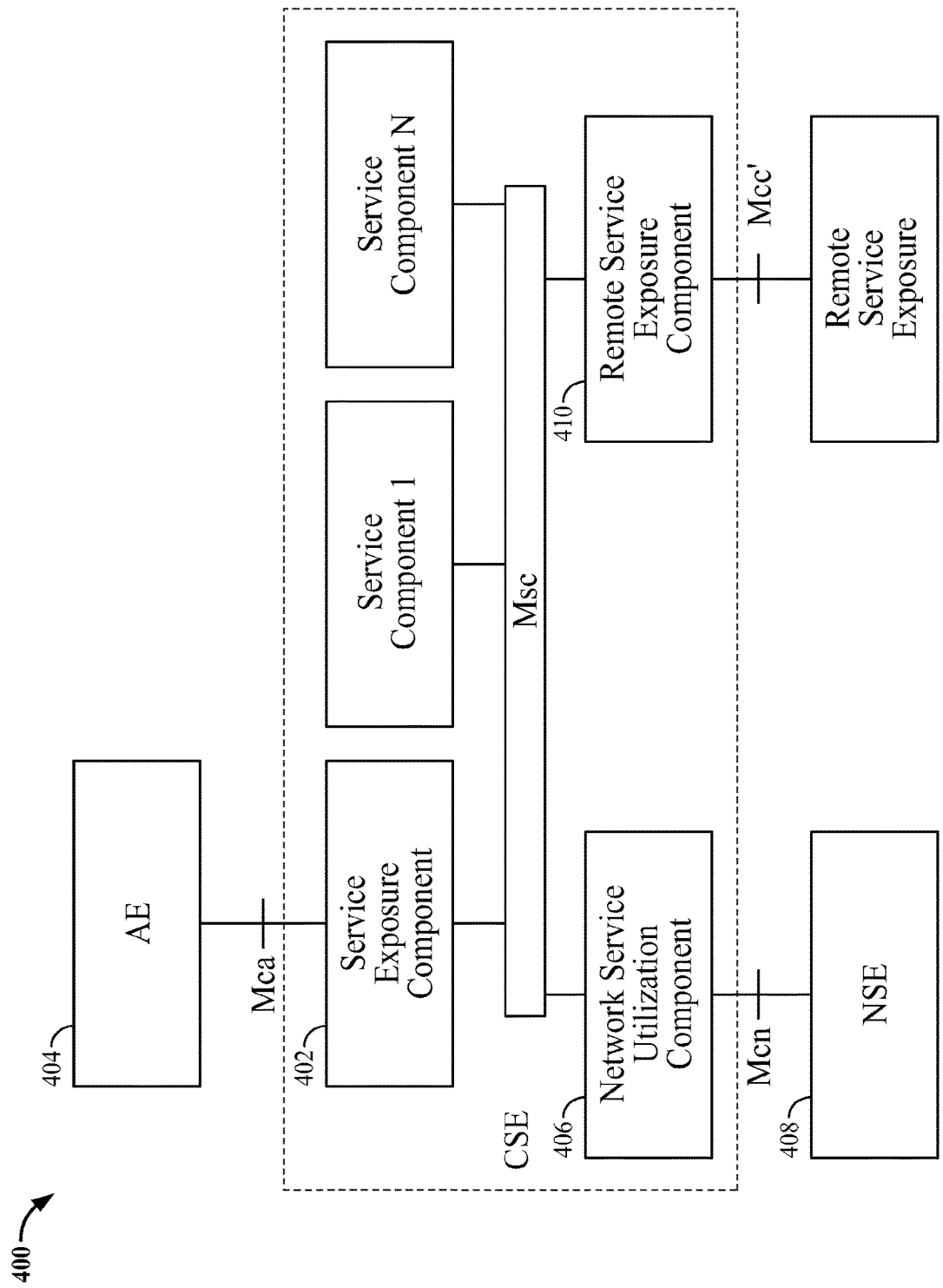
FIG. 4 is a diagram that illustrates an M2M Service Architecture that augments the oneM2M Functional Architecture by specifying M2M Services provided to M2M Application and M2M Service Providers.
Figure 5:
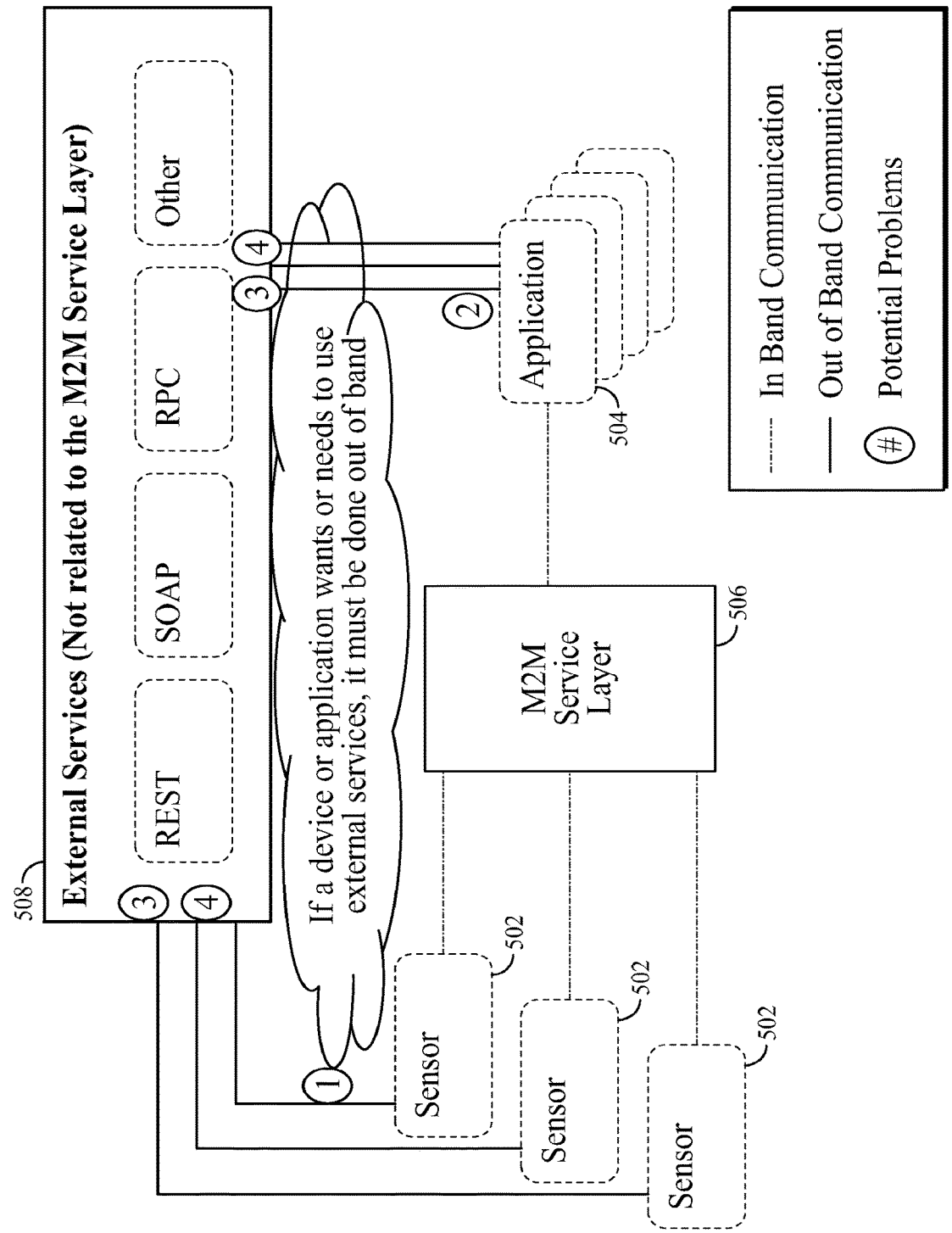
FIG. 5 is a diagram that illustrates the use of out of band communications to request third party services.

In the M2M standards, there is no support for requesting access to Third Party Services via the M2M Service Layer. Hence, the devices, sensors and applications associated with the M2M Service Layer must instead use out of band communications procedures to request this service as depicted in FIG. 5. FIG. 5 is a diagram that shows the use of out of band communications to request third party services.

An example deployment is shown in FIG. 5 where the "Sensors" 502 and "Applications" 504 are connected to one another via the M2M Service Layer 506 and communicate using the M2M Service Layer defined protocols. The example will be a security system.

A small security camera (the sensors 502 in FIG. 5) takes pictures and sends the images to the Service Layer 506 where they are stored. In addition to the raw images, the security system also provides the following features:

1 Apply motion detection algorithms on the image and store the result in the Service Layer.
2 Generate a SMS alert to a user's mobile device if motion is detected.
3 Provide compressed versions of the images to reduce bandwidth requirements.
4 Provides facial recognition to identify the person in the image.

To implement this security system using the existing M2M Service Layers 506, any of the following options can be implemented based on the system analysis and trade-offs:

1 Build the sensor 502 so that each of the desired features is implemented on the device.
2 Build the sensor 502 so that it can request these features via Third Party Services 508.

3 Perform some of the desired features on the end user application.

4 Build the end user application so that it can request these features via Third Party Services.

There are several problems of this approach (the numbered items in FIG. 5 correspond to the list below):

1) M2M/IoT devices or sensors 502 are intended or expected to be very constrained devices. If those devices or sensors have to perform computationally complex operations or implement another interface, besides the interface to the M2M Service Layer, to access Third Party Services 508, it will increase the size, complexity and cost of those devices or sensors.
2) End user applications 504, which may be constrained as well, may have to interface with and coordinate responses from one or more Third Party Services 508. This adds complexity for those applications.
3) The Third Party services 508 will have to support many more connections from the devices, sensors and applications which can lead to complexity and scalability problems for the Third Party Service 508. Additionally a given Third Party Services 508 can be performing services on the same piece of data multiple times if multiple applications request the service on the same data. Multiple requests on the same data can lead to poor quality of service as requests may have longer wait times before getting a response because of the larger number of requests e.g. if multiple end user applications request compression of the same image.
4) Devices, sensors 502 and applications 504 are required to support more API's to external services and these additional API's increase likelihood that the device will require periodic software updates. For example, if a Third Party Service Provider makes a change to its API, this can require an update to all of the deployed devices, sensors and applications.

Figure 6:
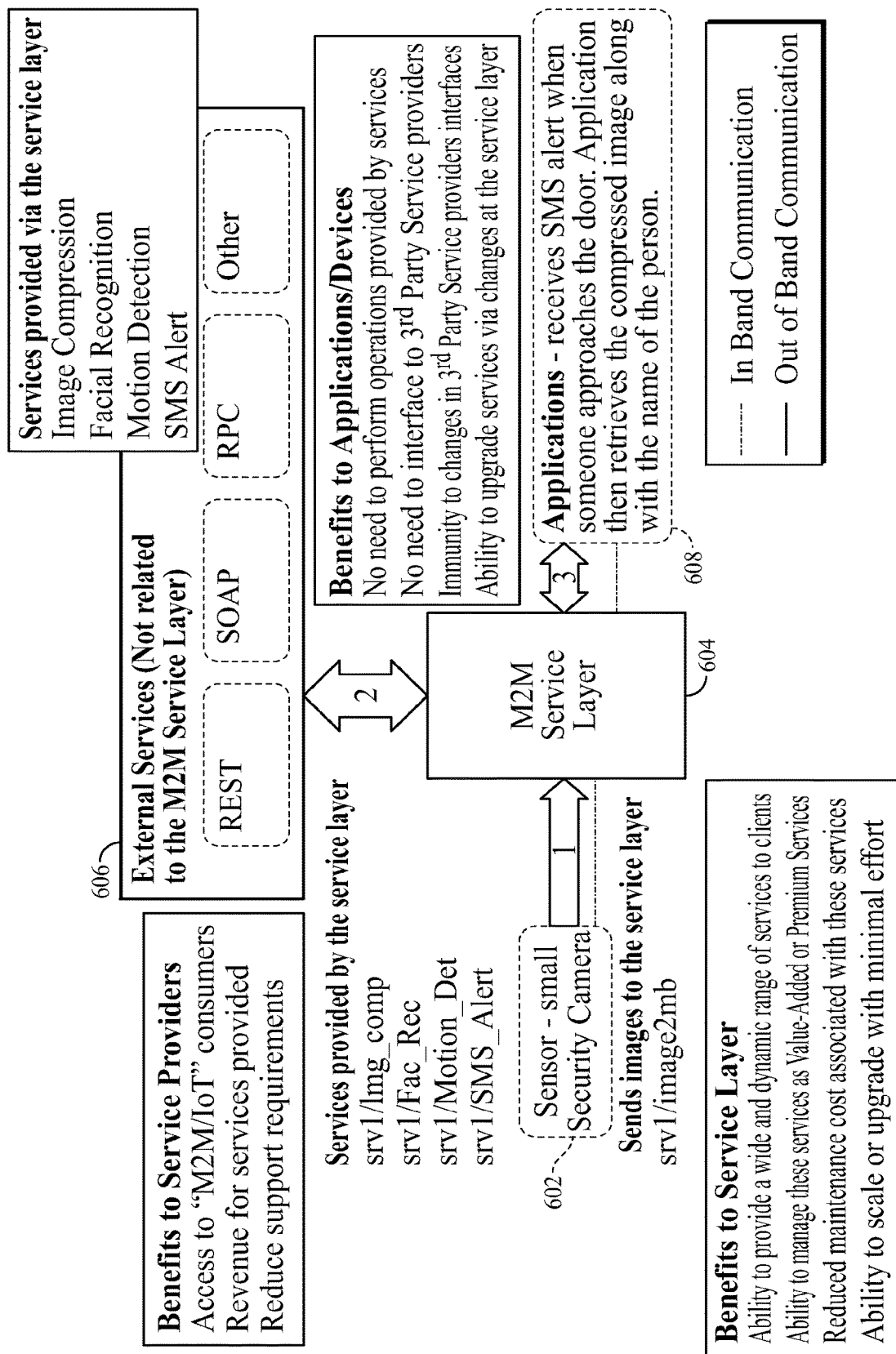
FIG. 6 is a diagram that illustrates a system that allows the M2M Service Layer to access the services of third parties and exchange data with third parties.

FIG. 6 is a diagram that illustrates the use of a system that allows the M2M Service Layer 604 to access the services of third parties and exchange data with third parties 606. The M2M Service Layer 604 is then able to act as a proxy between M2M Devices, such as the sensor 602 and application 608, and the third party services. The M2M Service Layer is able to present a single/consistent interface, or APT, to the M2M Device and hide the details of the third party service 606 from the M2M Device.

FIG. 6 illustrates how an example security system benefits from these procedures in a M2M deployment. The small security cameras 612 take pictures and send the images to the Service Layer 604 where it is stored. When each image arrives at the Service Layer 604, it is also sent by the M2M Service Layer 604 to a Third Party Service 606 where motion detection is performed on this image and the result also stored in the Service Layer 604. In the event that the result indicates that there is motion, a SMS alert is signaled to a user's mobile device. When the user application 608 retrieves the image, a compressed version of the original image is sent as the response (rather than the original full resolution image). The user application 608 also has access to the results of facial recognition services used to identify the person in the image.

By using the methods defined herein, a number of benefits are afforded to the various parties in this systems.

Device and sensor manufacturers are able to build sensors 602 dedicated to the specific sensing function and not have to add additional hardware and software capabilities to perform that additional processing provided by the Third Party Services 606. This directly leads to less complexity, smaller size, shorter schedules and reduced costs.

Device and sensor manufacturers are able access the Third Party Services 606 using the existing M2M Service Layer 604 protocols and do not need to add additional hardware and/or software that may be required to support other web service protocols. This directly leads to less complexity, smaller size, shorter schedules and reduced costs.

Device and sensor manufacturers are able to provide updates to the features provided by third parties by changing configurations in the M2M Service Layer 604, rather than using some type of device management functionality. This directly leads to less complexity, smaller size, shorter schedules and reduced costs.

Applications 608 can provide more feature rich functions with much less complexity by using the Third Party Services 606 available via the M2M Service Layer 604. This will directly lead to better performance and maintainability of the application.

Applications 608 do not need to be aware of the individual Third Party Service protocols in order to use the features available. This will directly lead to less complexity in the application.

Third Party Services 606 are able to provide their services to a larger number of clients through fewer connections since the Service Layer 604 is the 'proxy' for the Service Layer clients. This directly leads to reduced complexity, improved performance and better scalability.

Third Party Services can be advertised as built-in features of the M2M Service Layer from the directory of services.

Device, sensor and application developers can use the directory of services feature to discover supported services, select services, perhaps request new services or even identify the need for new services. This directly leads to improved capabilities offered to all parties.

The M2M Service Layer 604 is able to provide more advanced services without the need to develop them internally. This directly leads to reduced complexity.

This disclosure also defines an embodiment for how these procedures can be implemented in an oneM2M Service Layer to allow Service Layer clients access to Third Party Services 606 via normal Service Layer APT calls.

Three main methods are defined:

Provisioning the M2M Service Layer 604 with the details of how to access the third Party Service 606.

Enabling the M2M Service Layer clients to discover these available Third Party Services 606.

Implementing a M2M Service Layer Interface that triggers the request to the Third Party Service 606.

Figure 7:
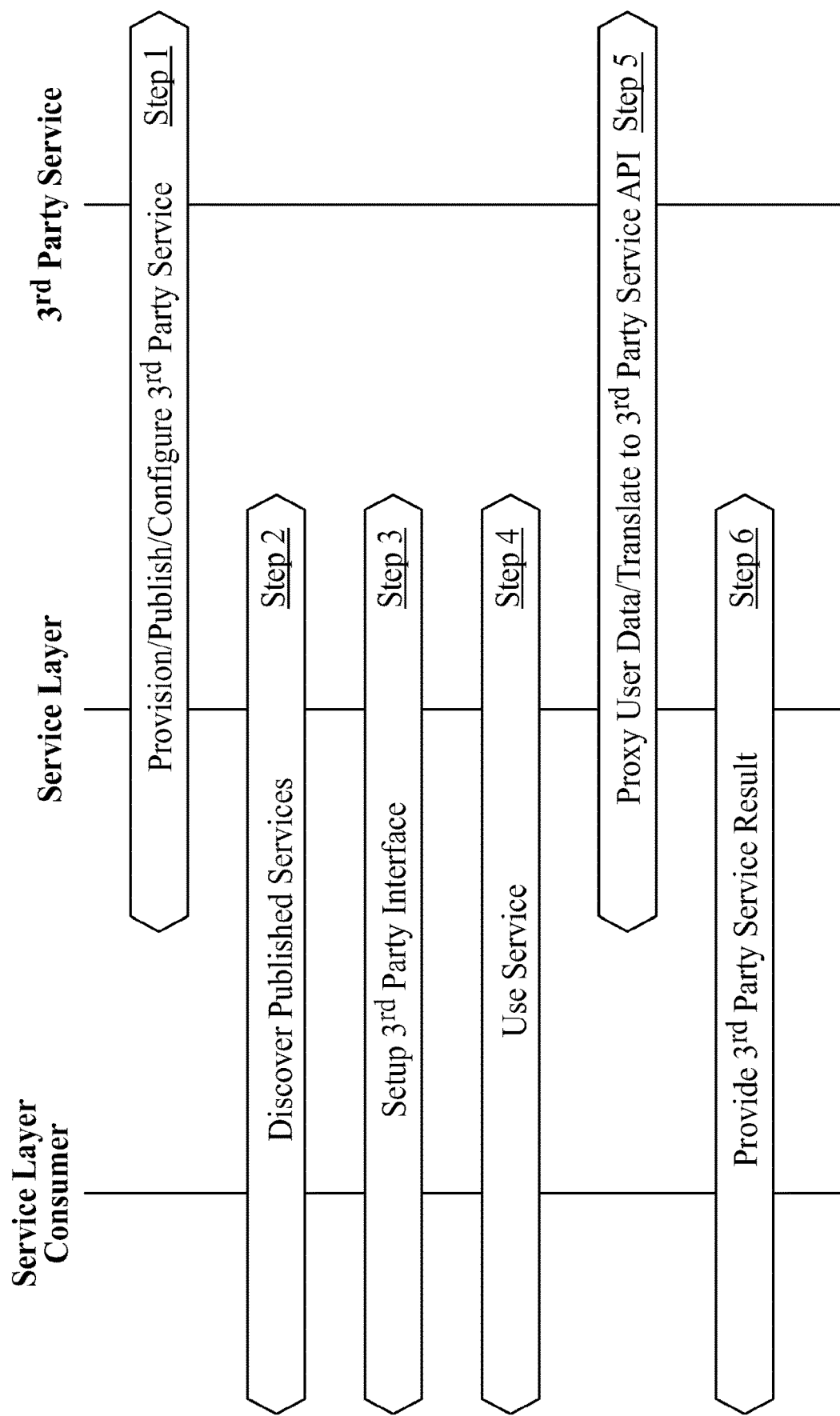
FIG. 7 is a diagram that summarizes steps to allow the Service Layer clients to access a Third Party Service.

FIG. 7 is a diagram that summarizes steps to allow the Service Layer clients 602 to access the Third Party Service 606, step 1 is a method for the Third Party Service API and protocol to be known by the M2M Service Layer. Once this information is available to the Service Layer, step 2 is a way for Service Layer clients (or their developers) to discover information about these Third Party Services 606. A Service Layer client that wants to use the Third Party Service needs to setup the usage parameters in a manner that is consistent with the existing Service Layer protocols in step 3. At that point, when a Service Layer client accesses the M2M Service Layer interface to the Third Party Service 606, in step 4, the Service Layer 604 translates or proxies the request to the Third Party Service 606 in step 5, which includes handling all of the communications necessary to get the output response from the Third Party Service 606 and provide that response back to the original requestor or other destination as defined by the M2M Service Layer or Service Layer client in step 6.

A service object that can be created for or by a Third Party Service 606. The service objects are typically located in the Service Layer, e.g. in the oneM2M embodiment, the service objects are represented as new resources. They can contain the details of what the Third Party Service offers and how to interface with the Third Party service. The method of actually representing a service object is implementation dependent. Some example implementations can be programming language constructs like Java or C++ classes or structures, database records, xml documents, or Service Layer resources.

Regardless of how it is implemented in a given Service Layer, a service object is the set of information necessary to allow M2M Service Layer clients to discover, configure and use the Third Party Services described by the object, as well as the methods or procedures performed on or by the object.

The description of the service object can be (but not necessarily limited to being) grouped into in three types of information. The service object is defined initially here, and then the definition of the Service Object is expanded upon as the methods of this disclosure are described.

Service Object Information can include Third Party Service Information, Party Service Discovery and Access Information, and Service Interface Information.

Third Party Service Information can contain the information needed to communicate between the Service Layer 604 and the Third Party Service 606. This can include the description language used by the Third Party Service (such as WSDL) or other standard or non-standard interface methods. It can also contain the specification of a custom communication protocol. Steps 1 and 5 of FIG. 7 show this.

Third Party Service Discovery and Access Information can contain the information that the M2M Service Layer uses to advertise or announce the service to the M2M Service Layer clients or entities. This can include generic high level descriptions of the features, costs of the features, the name of the Third Party Service provider, links to information on how to use the service, etc. Additionally, this can contain the means to request access to use these Third Party Services 606. Steps 1 and 2 of FIG. 7 show this.

Service Interface Information can be specific to the M2M Service Layer. It describes how the M2M Service Layer clients should make requests or calls that trigger the translation or proxy call to the Third Party Service 606 along with all of the parameters and inputs needed for the Third Party Service call. Steps 3, 4 and 6 of FIG. 7 show this.

This service object may be made directly available to Service Layer clients for direct use. Alternatively only portions of the Service Object can be made available, exposing only a 'Service Layer' compliant interface.

The following sections describe the procedures performed on the service object information.

Details of Provisioning the Third Party Interface. Web services 606 can have any number of different protocols for accessing their available services. Through the methods described in this disclosure they are able to provide a description of their interface in the description language, if available, corresponding to the web service protocol which they already use.

The Service Layer 604 can use this information to access the Third Party Service 606 on behalf of the Service Layer clients 608. The Service Layer 604 communicates with the Third Party Service 606 using the protocol of the Third Party Service 606, thereby allowing the Third Party Service 606 to remain "unaware" of the Service Layer protocol used by the originator of the request. Additional details for the Service Object are defined to store this information.

Service Object Third Party Service Information can have a service API. The Third Party Service API is the information that the M2M Service Layer needs in order to send a message to the Third Party Service requesting the specified service. This includes the call flows needed between the M2M Service Layer 604 and the Third Party Service 606. Also included is the addressing information (FQDN or IP address and port), transport protocols (UDP, TCP, etc), and message formats (XML, png, etc).

The methods for providing the Third Party Service information can have a variety of specific implementations. An example implementation can be a provisioning step where the information is manually or in a non-automatic way entered into the Service Object database or storage device/procedure. Another example can be the development of an API where a Service Description language can be used by the Third Party Service 606 to define its interface. In this case the API can support any number of protocol descriptions, such as WSDL shown in Example 1. Another example can be a method where the M2M Service Layer initiates the retrieval of an available description of a Third Party Service 606.

Example 1—WSDL Document Structure

```
<definitions>
    <types>
        definition of types
    </types>
    <message>
        definition of a message....
    </message>
    <portType>
        <operation>
            definition of an operation
        </operation>
    </portType>
    <binding>
        definition of a binding....
    </binding>
    <service>
        definition of a service....
    </service>
</definitions>
```

The following example 2 shows a sample WSDL document that can be parsed and mapped to native M2M Service Layer protocols.

Example 2—Temperature Conversion Service Description

```
<?xml version="1.0" encoding="utf-8"?>
<wsdl:definitions
xmlns:tm=http://microsoft.com/wsdl/mime/textMatching/"
xmlns:soapenc=http://schemas.xmlsoap.org/soap/encoding/"
xmlns:mime=http://schemas.xmlsoap.org/wsdl/mime/"
xmlns:tns=http://www.webserviceX.NET/"
xmlns:soap=http://schemas.xmlsoap.org/wsdl/soap/"
xmlns:s=http://www.w3.org/2001/XMLSchema
xmlns:soap12="http://schemas.xmlsoap.org/wsdl/soap"12/"
xmlns:http=http://schemas.xmlsoap.org/wsdl/http/
xmlns:wsdl="http://schemas.xmlsoap.org/wsdl/"
targetNamespace="http://www.webserviceX.NET/">
    <wsdl:types>
```

-continued

```
<s:schema elementFormDefault="qualified"
      targetNamespace="http://www.webserviceX.NET/">
<s:element name="ConvertTemp">
  <s:complexType>
    <s: sequence>
      <s:element minOccurs="1" maxOccurs="1"
            name="Temperature" type="s:double"/>
        <s:element minOccurs="1" maxOccurs="1"
            name="FromUnit" type="tns:TemperatureUnit"/>
    <s:element minOccurs=" 1" maxOccurs=" 1"
            name="ToUnit" type="tns:TemperatureUnit"/>
</s:sequence>
    </s:complexType>
  </s: element>
<s:simpleType name="TemperatureUnit">
  <s:restriction base="s:string">
    <s: enumeration value="degreeCelsius"/>
    <s: enumeration value="degreeFahrenheit"/>
    <5: enumeration value="degreeRankine"/>
    <s: enumeration value="degreeReaumur"/>
    <s: enumeration value="kelvin"/>
  </s:restriction>
</s:simpleType>
<s:element name="ConvertTempResponse">
  <s:complexType>
    <s: sequence>
      <s:element minOccurs=" 1" maxOccurs=" 1"
            name="ConvertTempResult" type="s:double"/>
    </s:sequence>
  </s:complexType>
</s:element>
<s:element name="double" type="s:double"/>
<is:schema>
</wsdl:types>
<wsdl:message name="ConvertTempSoapTn">
    <wsdl:part name="parameters" element="tns:ConvertTemp"/>
</wsdl:message>
<wsdl:message name="ConvertTempSoapOut">
    <wsdl:part name="parameters"
            element="tns:ConvertTempResponse"/>
</wsdl:message>
<wsdl:portType name="ConvertTemperatureSoap">
    <wsdl:operation name="ConvertTemp">
      <wsdkinput message="tns:ConvertTempSoapIn"/>
      <wsdkoutput message="tns:ConvertTempSoapOut"/>
    </wsdl:operation>
</wsdl:portType>
<wsdl:binding name="ConvertTemperatureSoap"
            type="tns:ConvertTemperatureSoap">
<soap:binding
            transport="http://schemas.xmlsoap.org/soap/http"/>
<wsdl:operation name="ConvertTemp">
    <soap:operation
            soapAction="http://www.webserviceX.NET/ConvertTemp"
            style="document"/>
    <wsdl:input>
      <soap:body use="literal"/>
    </wsdl:input>
    <wsdl:output>
      <soap:body use="literal"/>
    </wsdl:output>
  </wsdl:operation>
</wsdl:binding>
<wsdl:service name="ConvertTemperature">
  <wsdl:port name="ConvertTemperatureSoap"
            binding="tns:ConvertTemperatureSoap">
    <soap:address location=
            "http://www.webservicex.net/ConvertTemperature.asmx"/>
    </wsdl:port>
</wsdl:service>
</wsdl:definitions>
```

The WSDL document in Example 2 describes an API to a service that converts temperatures from one unit of measurement to another. The WDSL document can be parsed to extract the following essential pieces of information needed by the M2M Service Layer to map required API parameters to corresponding parameters native to the M2M Service Layer.

A sample request from the M2M Service Layer 604 defined by this service description document is shown in Example 3:

Example 3: Temperature Conversion Request

```
<soap:Envelope xmlns:soap="http://www.w3.org/2003/05/soap-envelope"
    xmlns:web="http://www.webserviceX.NET/">
    <soap:Header/>
    <soap:Body>
      <web:ConvertTemp>
        <web:Temperature>40<web:Temperature>
        <web:FromUnit>degreeCelsius<web:FromUnit>
        <web:ToUnit>degreeFahrenheit<web:ToUnit>
      <web:ConvertTemp>
    <soap:Body>
</soap:Envelope>
```

An M2M Service can identify the three parameters in this request from the WSDL document shown in Example 3 from ConvertTemp data type. The type of mapping from these inputs to the M2M ServiceLayer types can be derived from the document, where the "web:Temperature" parameter is defined as a "s:double" and the "web:FromUnit" and "web:ToUnit" parameters are defined as a choice of values from the set defined in "tns:TemperatureUnit".

In addition to getting the description of how to access the Third Party Service 606, the Service Layer 604 gets the means for specifying the credentials needed to access the Third Party Service 606. For example, the M2M Service Layer 604 may be able to secure credentials that allow all Service Layer clients 608 access to the Third Party Service 606 using the credentials of the M2M Service Layer 604. In this case the M2M Service Layer 604 may have established an agreement for billing for the use of the services which may be passed on to the M2M Service Layer clients 608 or offered as a valued added service. Another example may be such that the M2M Service Layer 608 client has its own credentials to use this service and needs to provide this information for each use of the service, such as all devices from a particular manufacturer use a specific credential provided to the manufacturer by the Third Party Service provider. In this case billing can be outside the scope of the M2M Service Layer 604, other than data usage or other agreed arrangements.

Once the Third Party Services interface definitions are stored by the Service Layer 604, there is a method to make these services known and accessible to the Service Layer clients. The Service Layer 604 is able to "advertise" these services to the Service Layer clients 608 and "describe" the Service Layer 604 defined interface that triggers a request to the third party Service 606.

The Service Layer 604 provides a directory of services that Service Layer clients 608 can read to understand what services are available, and request details of how to use those services. Additional details for the Service Object are defined to store this information.

Service Object third Party Service Discovery and Access Information can have a Service Description that is a description of the service provided. The content and format of this can have a variety of specific implementations. For example, it can be an HTML description that is meant to be viewed by developers or end users to describe an offered service during development or equipment/application setup. This can include any type of information related to features, cost, usage requirements, etc. The service description information also includes a method to define keys or indexes so the Service Layer clients can perform searches to find a particular type of search, for example GET service?type=image_compression.

Using the information provided above, Service Layer Client developers is able to search for services that can add value to their own capabilities and request permissions to use that service through native Service Layer protocols.

When the M2M Service Layer clients 608 want to use a Third Party Service 606, the M2M Service Layer 604 uses the Service API information to properly form the message or messages to the Third Party Service 606. Through the methods described in this disclosure the Service Layer 604 defines the interface that allows the Service Layer clients 608 to access the Third Party Services 606 using protocols that are native to the service layer.

Additional details for the Service Object are defined to store this information. Service Object Third Party Service Interface Information can contain the Service Layer defined interface for Service layer clients to use to access the Third Party Service 606. This information includes how to specify input parameters, output parameters, access credentials, and any other information needed by the Third Party Service 606. This information also specifies how to trigger the Service Layer 604 to initiate or make the Third Party Service request on behalf of the Service Layer client. The Service Layer 604 defines this interface by evaluating or parsing the Service API information and mapping each of the API parameters to a native Service Layer interface or property, e.g. a Third Party Service API that requires an image as an input parameter may be mapped to the URI of an image that the Third Party Service can retrieve. A M2M Service Layer application developer can use this information to access the Third Party Service 606.

Using the details of how to interface with the Third Party service 606, the Service Layer 604 maps the native Service Layer objects or resources to the Third Party Service specified inputs to and sends the request using the web service protocol supported by the Third Party Service 606. The Service Layer 604 also handles the result or response from the Third Party Service 606 and maps it back to the appropriate native Service Layer response.

Figure 8A:
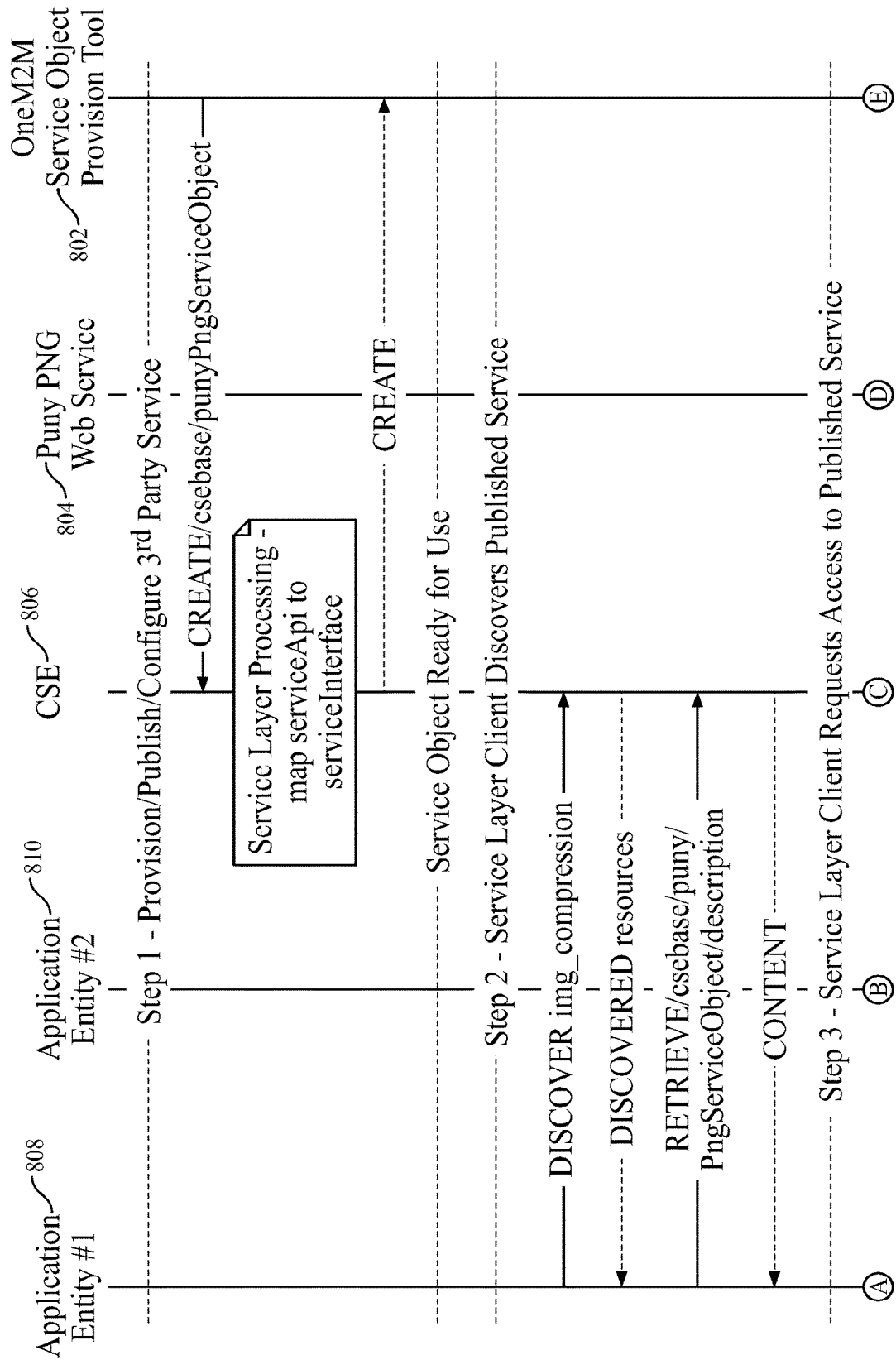
FIGS. 8A, 8B, and 8C together form a flow diagram that shows a oneM2M Resource-Oriented Architecture (RoA) Embodiment.
Figure 8B:
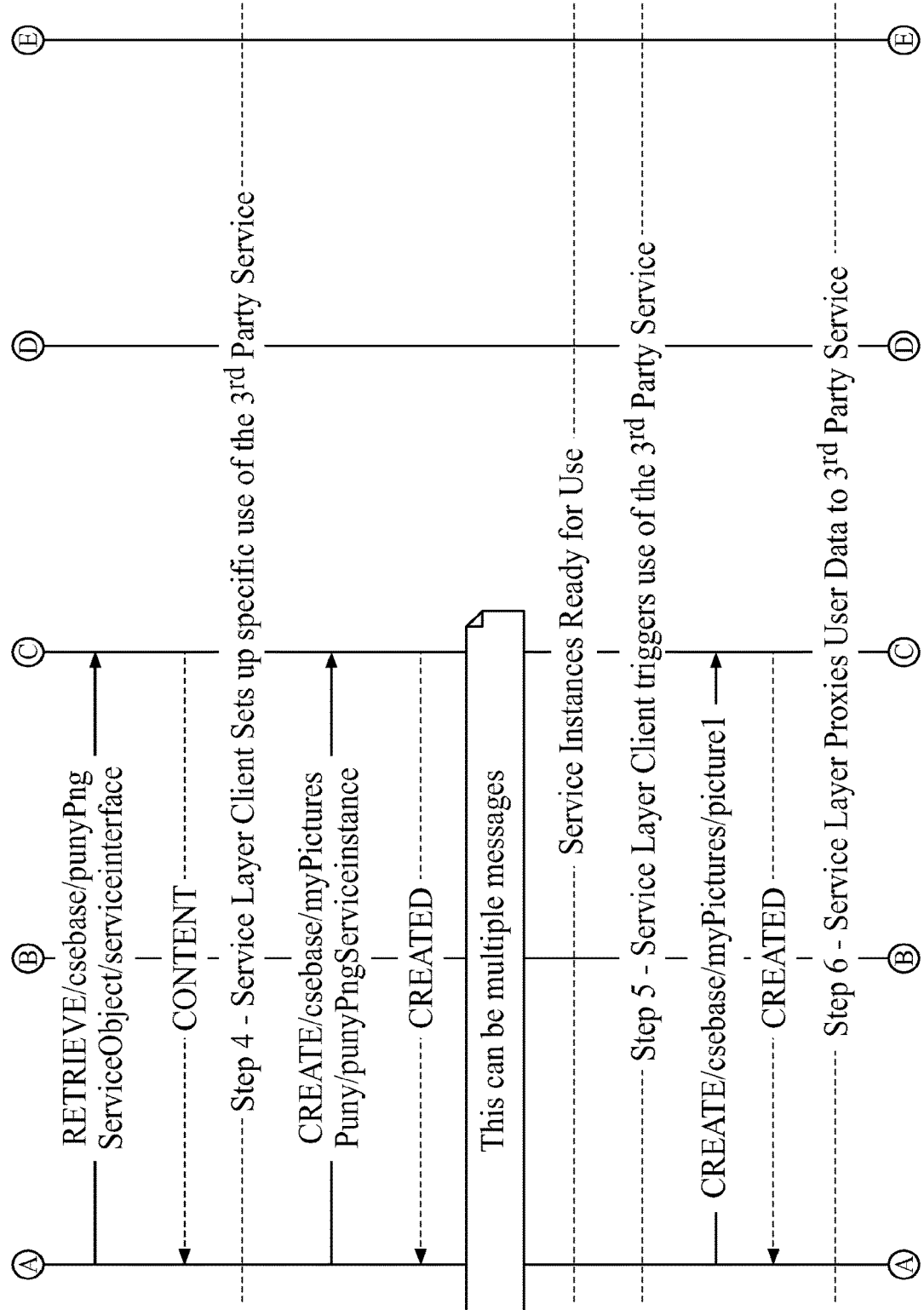
Figure 8C:
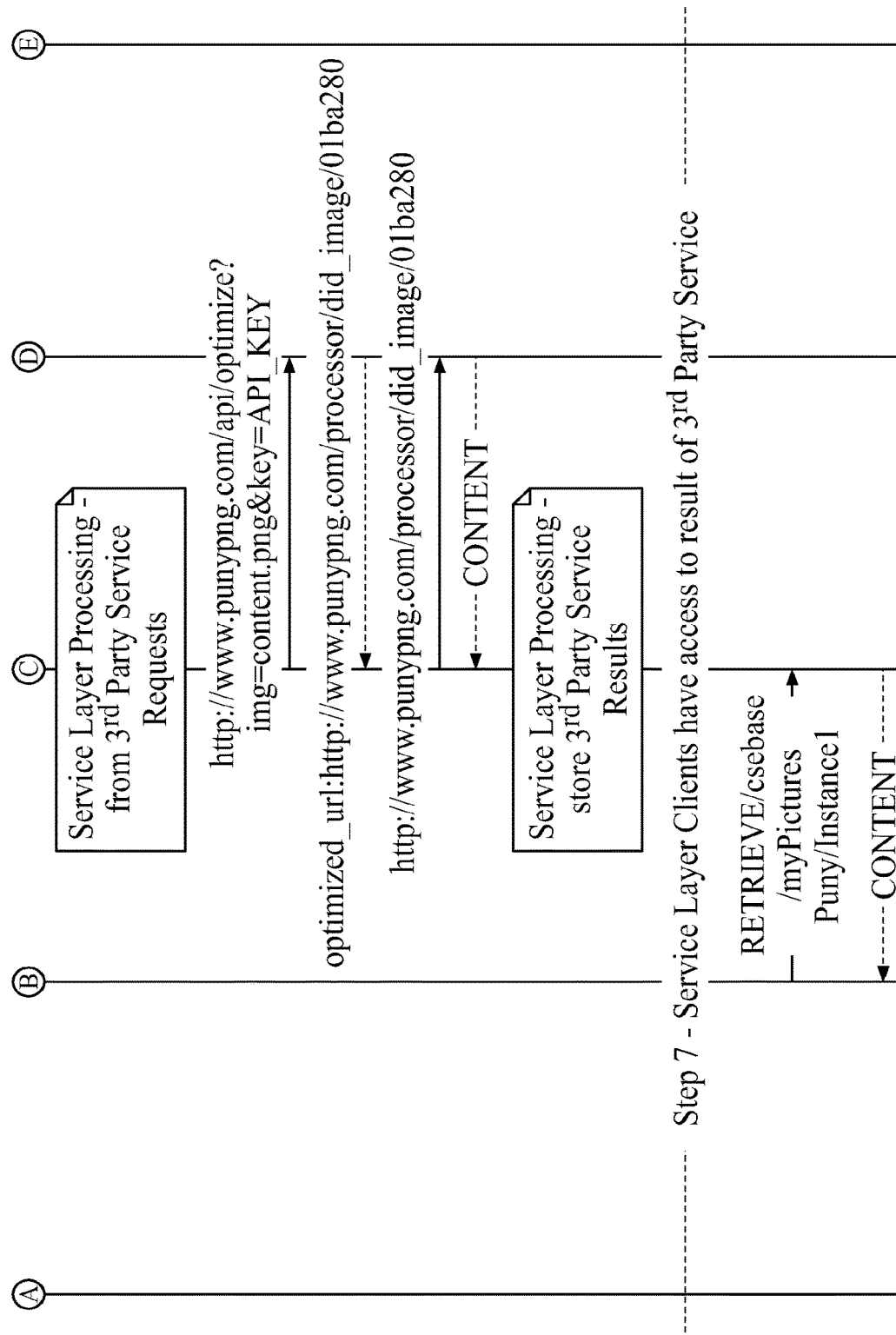

FIG. 8 is a flow diagram that shows a oneM2M RoA Embodiment. This figure shows one way that the methods and procedures described in this disclosure can be implemented in the oneM2M Architecture.

A oneM2M Service Object Provisioning Tool 802 can be a utility for provisioning the Service Object defined in this embodiment. This application is a oneM2M application that supports sending a Web Service API and description to the oneM2M Service Layer. In this example, the discovery of the Puny PNG Web Service 804 is done. It can be a service found via a web search, or it can be a custom implemented service specific to the Application Entities that use this service e.g. the security camera manufacturer can host a web service for only its cameras to access. The oneM2M Service Object Provisioning Tool 802 can communicates with the CSE via Mca reference point.

Figure 12:
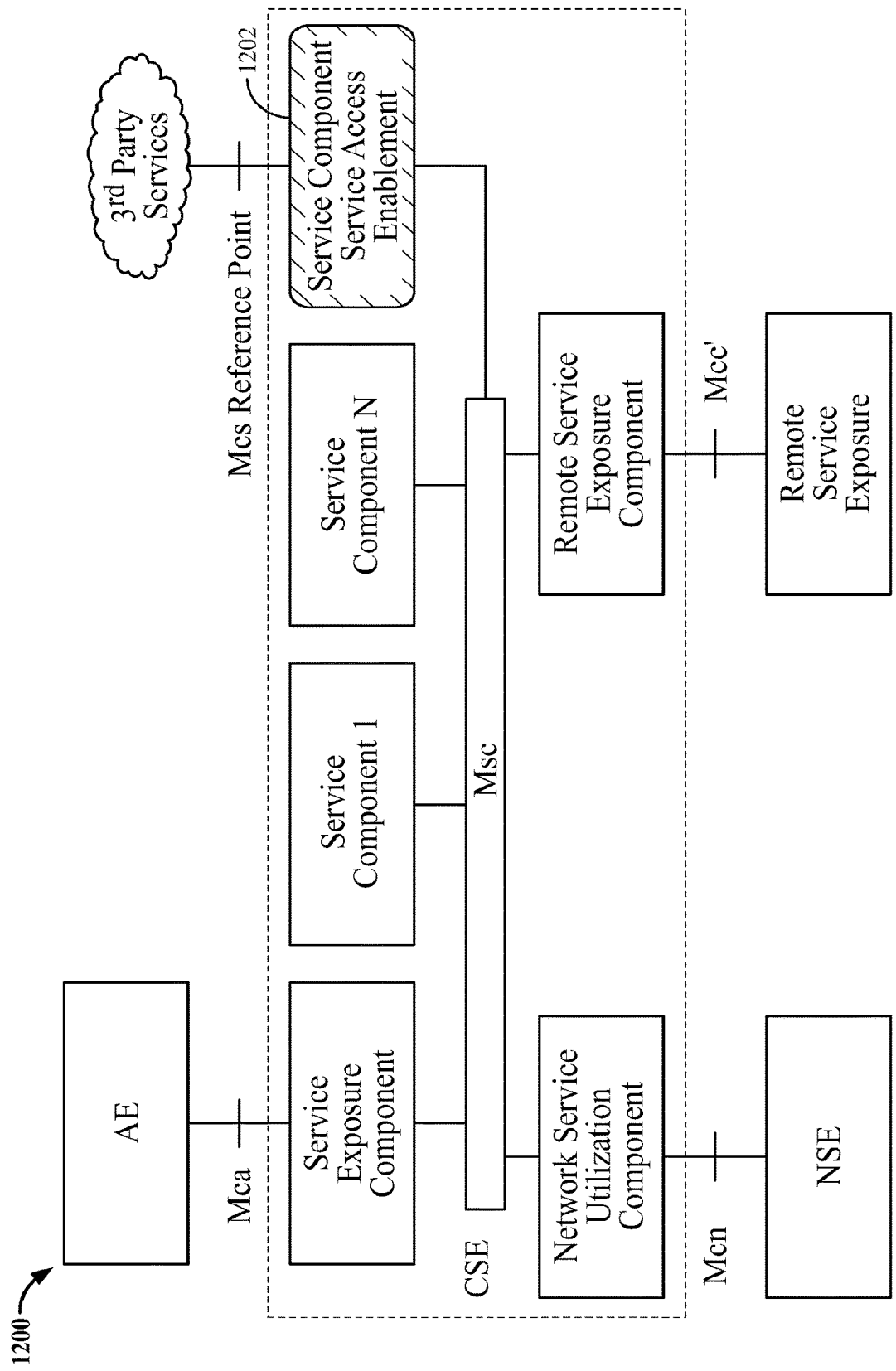
FIG. 12 is a diagram that illustrates a Service Access Enablement component within the oneM2M Services Architecture as well as the definition of a new reference point, Mcs.

In this example, the Puny PNG Web Service 804 is an active web service that provides limited free compress on png formatted images and additional services for a subscription fee. The Puny PNG Web Service 804 can require the use of an Access Key that you get by creating an account. The Puny PNG Web Service 804 can communicate with the CSE 806 via protocols native to the Third Party Service. This can be a new reference point in the oneM2M Architecture. This new reference point, Mcs, is shown in FIG. 12.

CSE 806 is an instance of an oneM2M Common Services Entity that supports the methods defined in this disclosure and this embodiment.

Application Entity #1 808 is a device or application that places images into the oneM2M CSE 806. In this example it performs the service object discovery and setup procedures. This step can have been done by a separate entity, such as a setup application that often accompanies hardware or devices. Application Entity #1 808 can be a remote security camera that takes pictures at a configured rate. The Application Entity #1 808 can communicate with the CSE 806 via Mca reference point.

Application Entity #2 810 can be an application that retrieves compressed versions of the images provided by Application Entity #1 808. Application Entity #2 810 can be a web based application that periodically gets the latest image from the oneM2M CSE 806. Application Entity #2 810 can communicates with the CSE 806 via Mca reference point.

In FIG. 8, the methods and procedures described in this disclosure are shown for the actors using the oneM2M Service Layer Architecture. Each of the main messages is annotated with a superscript that corresponds to the detailed description of that particular message.

In step 1 of FIG. 8, the Service Object provisioning tool 802 creates an instance of the Service Object resource and for the PunyPNG web service 804. The create primitive includes the Service API information as well as the Service Description information.

In this example, Service Credentials are not provisioned to the service layer, which requires Service Layer clients to request their own API_KEY using the Third Party Service defined procedures. This is a deployment decision between the Service Layer and the Third Party Service. Note that in a different deployment option, the oneM2M Service Layer may have an arrangement with the Third Party Service that allows the Service Layer to use a single key for all clients. This can slightly change some of the results shown below, but the process does not change.

```
Method: CREATE /csebase/punyPngServiceObject
Payload:
    <service Object id= "punyPngService ">
        <description>
            <body>
                <h1>punypng</h1>
                <h2>
                Image Compressor for Designers and
                Developers
                </h2>
                <h2>Supports: JPG, GIF and PNG. </h2>
                <h2> Go to PunyPNG.com to request an API
            Key</h2>
            </body>
        </description>
        <serviceApi>
        <request>
            http://www.punypng.com/api/optimize?img=image.
            png&key= API KEY
        </request>
        <response>
            {"original size":value, "optimized size":value, "opti
            mized_url":url, "group _id ":null, "savings_percent": v
            alue, "savings_bytes":value}
        </response>
        <request>
            "optimized_url":url
        </request>
        <response>
            {content}
        </response>
```

```
</serviceApi >
</serviceObject>
```

The oneM2M Service Layer analyzes and maps the service API provided in the request to a <serviceInterface> resource in the Service Layer. The mapping process can be done using web service description languages or manual configuration at the service layer. The example Request/Response pairs can generate the following service layer information:

```
Request 1 url: http://www.punypng.com/api/optimize
Request 1 parameter: img=image.png
Request 1 parameter: key= API KEY
Response 1 parameter: "original size":value
Response 1 parameter: "optimized size ":value
Response 1 parameter: "optimized_url ":url ← This url is used in Request 2
Response 1 parameter: "group_id ":null
Response 1 parameter: "savings _percent ":value
Response 1 parameter: "savings _bytes ":value
Response 1 parameter: "original size":value
Request 2 url: "optimized_url ":url ← This url came from response 1
Response 2: "content": value
```

In this Third Party Service API, there are 2 Request/Response pairs that generate 2 input parameters and 6 output parameters that get mapped to the Service Layer interface. An additional input parameter is specified by the Service Layer to allow configuration of which operation can trigger the service.

At this point the Service Layer has a Service Object instance for this Third Party Service ready for use by Service Layer clients.

In step 2 of FIG. 8, the Service Layer client discovers a published service. The application developer discovers Services that perform image compression using the Service Layer discovery procedures. The result of the discovery request includes URIs of the services that perform the desired feature while the second request gets the description of the service. It can be displayed in an HTML viewer as:

PunyPNG

Image Compressor for Designers and Developers

Supports: JPG, GIF and PNG.

Max 150 KB each, up to 15 files

Go to PunyPNG.com to request an API Key

In step 3 of FIG. 8, the Service Layer Client requests access to a Published Service. Once the Service Layer client finds a service that meets its needs, the client requests access to the Published Service. In this example embodiment, the oneM2M Service Layer allows READ access to this resource so that all clients have access if they implement the proper interface, as defined. The Service Layer client retrieves an interface description that specifies how the Third Party Service can be accessed.

```
<serviceInterface>
  <inputs>
    <input Type= "container">img</input>
    <input Type= "name_value">key</input>
    <trigger Operation= "operation"/>
  </inputs>
  <outputs
    <output
    Type= "container">compressed_img</output>
    <output Type= "container">original_size</output>
    <output Type= "container">optimizedsize</output>
    <output Type= "container">savings_percent</output>
    <output Type= "container">savings_bytes</output>
    <output Type= "container">original _size</output>
  </outputs>
  <description>
    There are 3 inputs: instance, value, and triggering must
    contain the URI to a container resource.
    Value is the KEY to use this service.
     Trigger is the action on the first input that will initiate
    the service. There are 6 outputs: compressed img is
    Mandatory, the others are Optional. Each output must
    contain the URI to a container resource where a
    content resource will be created with the indicated
    content.
  </description>
</serviceInterface >
```

In step 4 of FIG. 8, Service Layer Client sets up usage for the Third Party Service. Using the information from the interface description, the Application entity creates the <serviceInstance> resource with the parameters needed to implement the interface defined by the oneM2M Service Layer. In this example the Service Layer Client needs to specify the location (a container) of the images that can be compressed by the Third Party Service. Also needed are the Service Layer Client's API KEY and a location for the results of the Third Party Service, in this case the compressed images.

```
<serviceInstance id= "punyPngService">
  <serviceObjectUri>/csebase/punyPngServiceObject</serviceObjectUri>
  <inputs>
    <input param= "container">/csebase/myPictures<input>
    <input param= "key">AKUIFYY1GBDKJRB<input>
    <input param= "trigger">CREATED<input>
  </inputs>
  <outputs>
    <output
param= "compressed_img">/csebase/myPicturesPuny<output>
    <output
param= "optimized_size">/csebase/myPicturesPuny<output>
  </outputs>
</serviceInstance>
```

In step 5 of FIG. 8, Service Layer Client triggers use of Third Party Service. The Application Entity #1, in our example, CREATES images at /cesbase/myPictures. The target URI of the image along with the OPERATION on the target URI is the trigger for starting the Service Layer procedures to access the Third Party Service. In this example when a resource is successfully CREATED in/cesbase/myPictures the Service Layer can begin the process.

In step 6 of FIG. 8, Service Layer proxies user data to the Third Party Service. The <serviceInstance> resource created by the Service Layer Client, points to the original <serviceObject> resource. The serviceAPI provided in the CREATE <serviceObject> (step 1) specifies the content and format of web service request. The Service Layer performs the specified sequence of requests and responses using the data provided in the <serviceInstance> resource. At this time, the Service Layer can provide the web service with a charging identifier that the web service can use to identify the service layer and/or service client who is accessing the service.

The Service Layer places the result(s) into the locations specified by the Service Layer Client's <serviceInstance>. Optionally, the service layer can send a notification or a response message to the service layer client to let it know that the results are ready. (This option is not shown in the figure above).

In step 7 of FIG. 8, Service Layer Clients have access to the result of the Third Party Service. Once the Service Layer places the results into the specified output URI, other clients can have access to the result. In this example, AE #2 can RETRIEVE a compressed image instead of the original image.

Figure 15A:
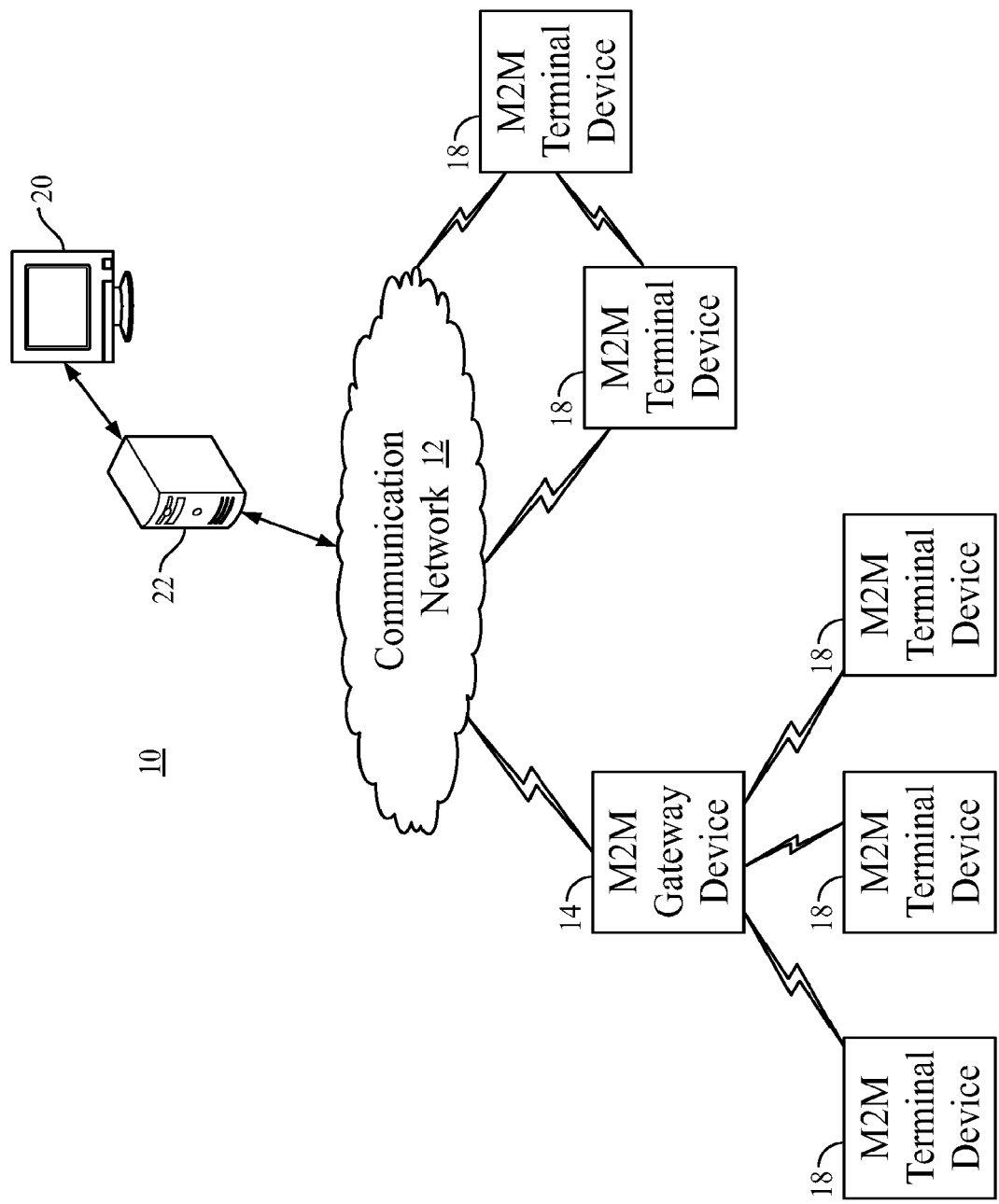
FIG. 15A is a diagram of an example machine-to machine (M2M), Internet of Things (IoT), or Web of Things (WoT) communication system in which one or more disclosed embodiments may be implemented.
Figure 15B:
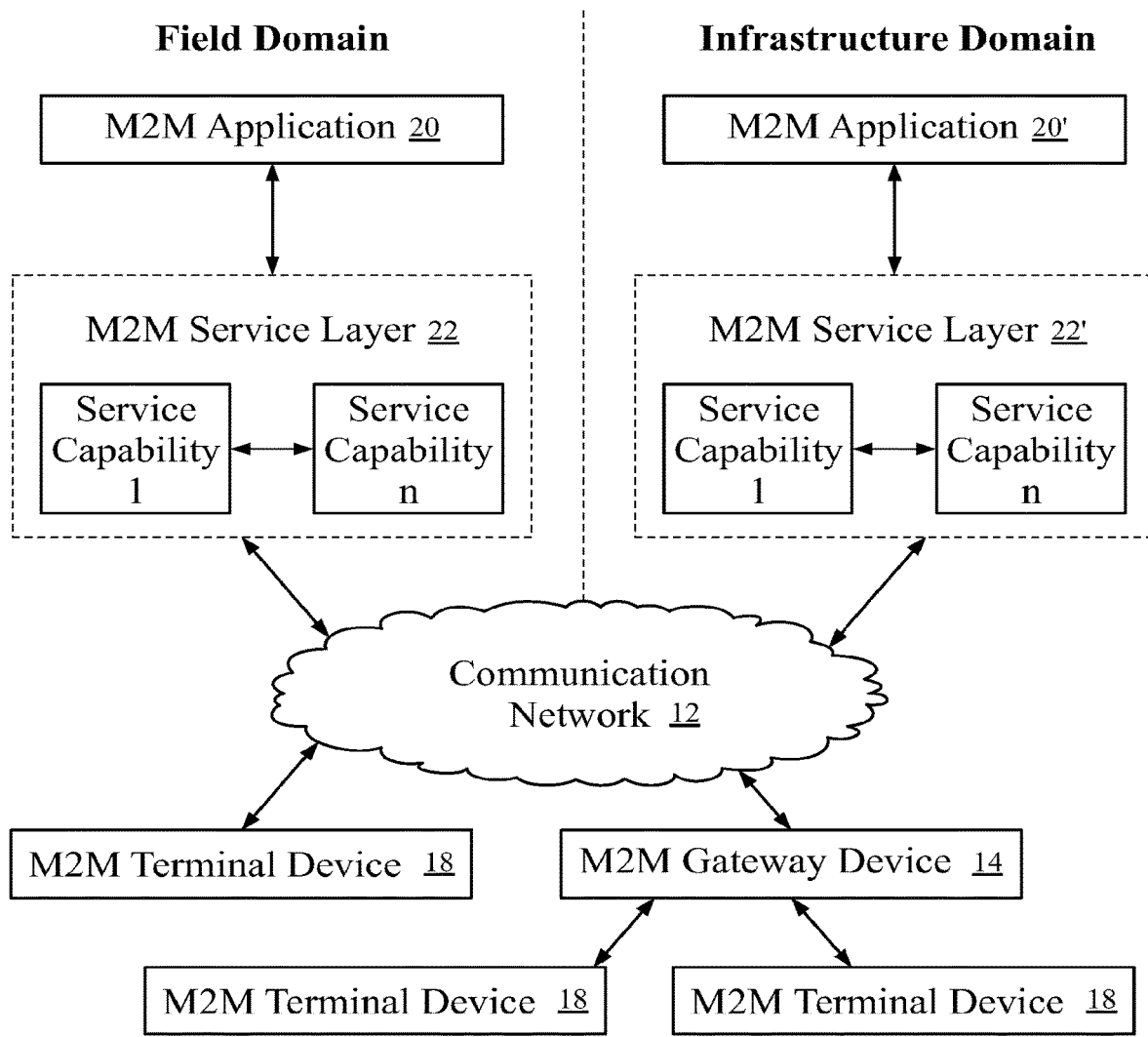
FIG. 15B is a system diagram of an example architecture that may be used within the M2M/IoT communications system illustrated in FIG. 15A.
Figure 15C:
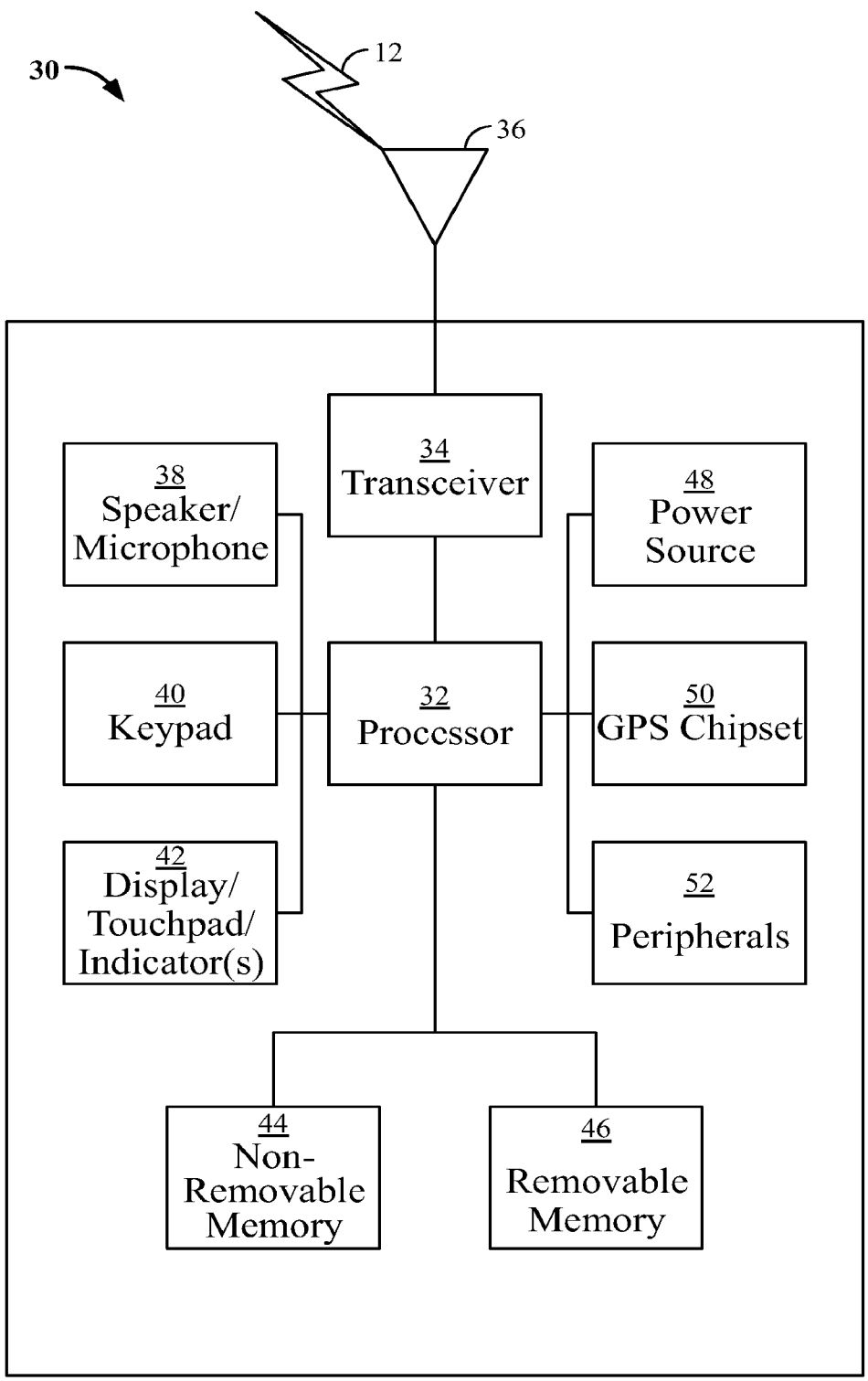
FIG. 15C is a system diagram of an example M2M/IoT terminal or gateway device that may be used within the communications system illustrated in FIG. 15A.
Figure 15D:
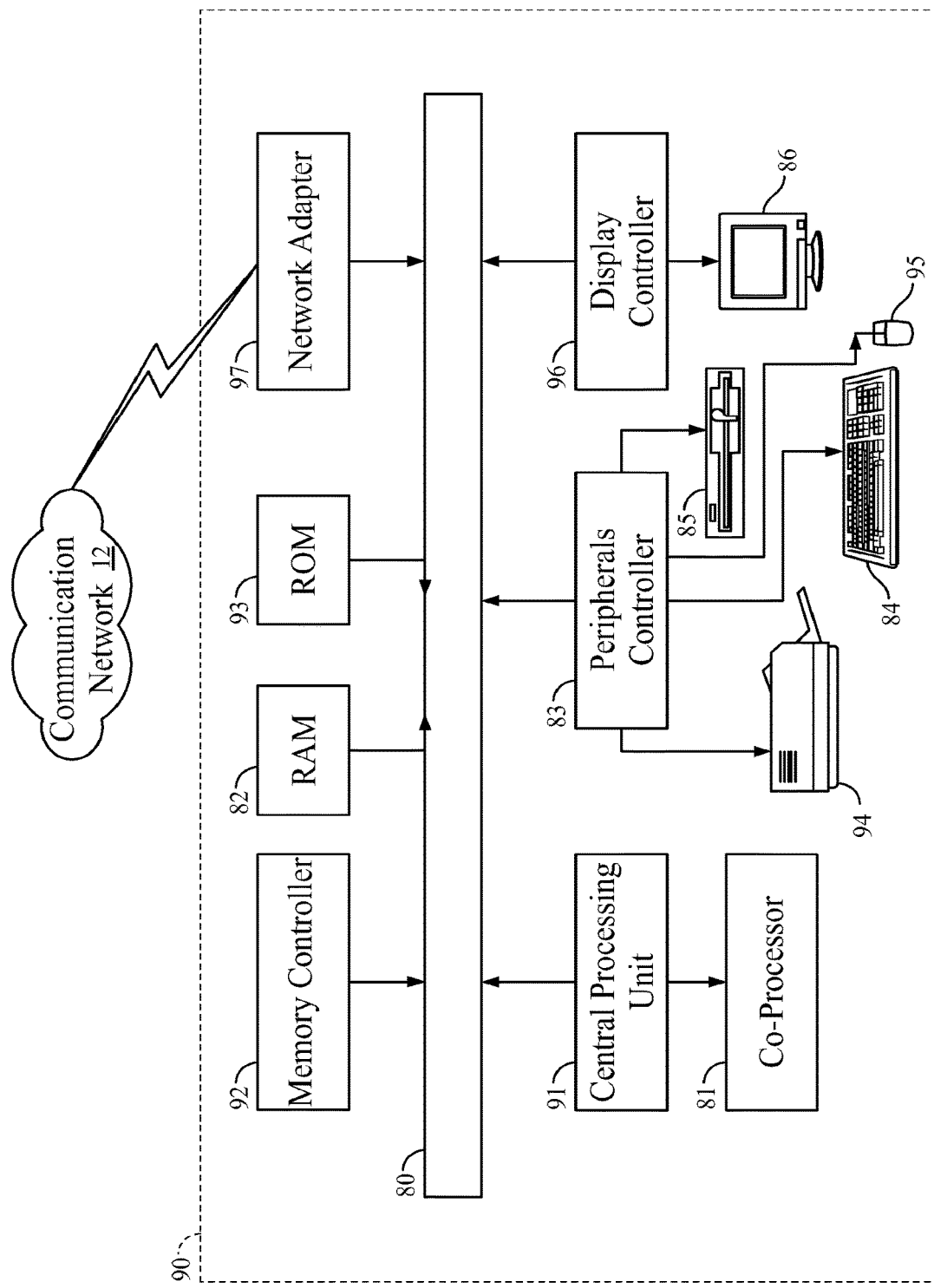
FIG. 15D is a block diagram of an example computing system in which aspects of the communication system of FIG. 15A may be embodied.

It is understood that the entities performing the steps illustrated in FIG. 8 are logical entities that may be implemented in the form of software (i.e., computer-executable instructions) stored in a memory of, and executing on a processor of, a device, server, or other computer system such as one of those illustrated in FIG. 15C or 15D (our two environment figures). That is, the method(s) illustrated in FIG. 8 may be implemented in the form of software (i.e., computer-executable instructions) stored in a memory of a computing device, such as for example the device or computer system illustrated in FIG. 15C or 15D, which computer executable instructions, when executed by a processor of the computing device, perform the steps illustrated in FIG. 8.

This embodiment in the oneM2M Service Layer defines two new resource definitions: <serviceObject> and <serviceInstance>.

Figure 9:
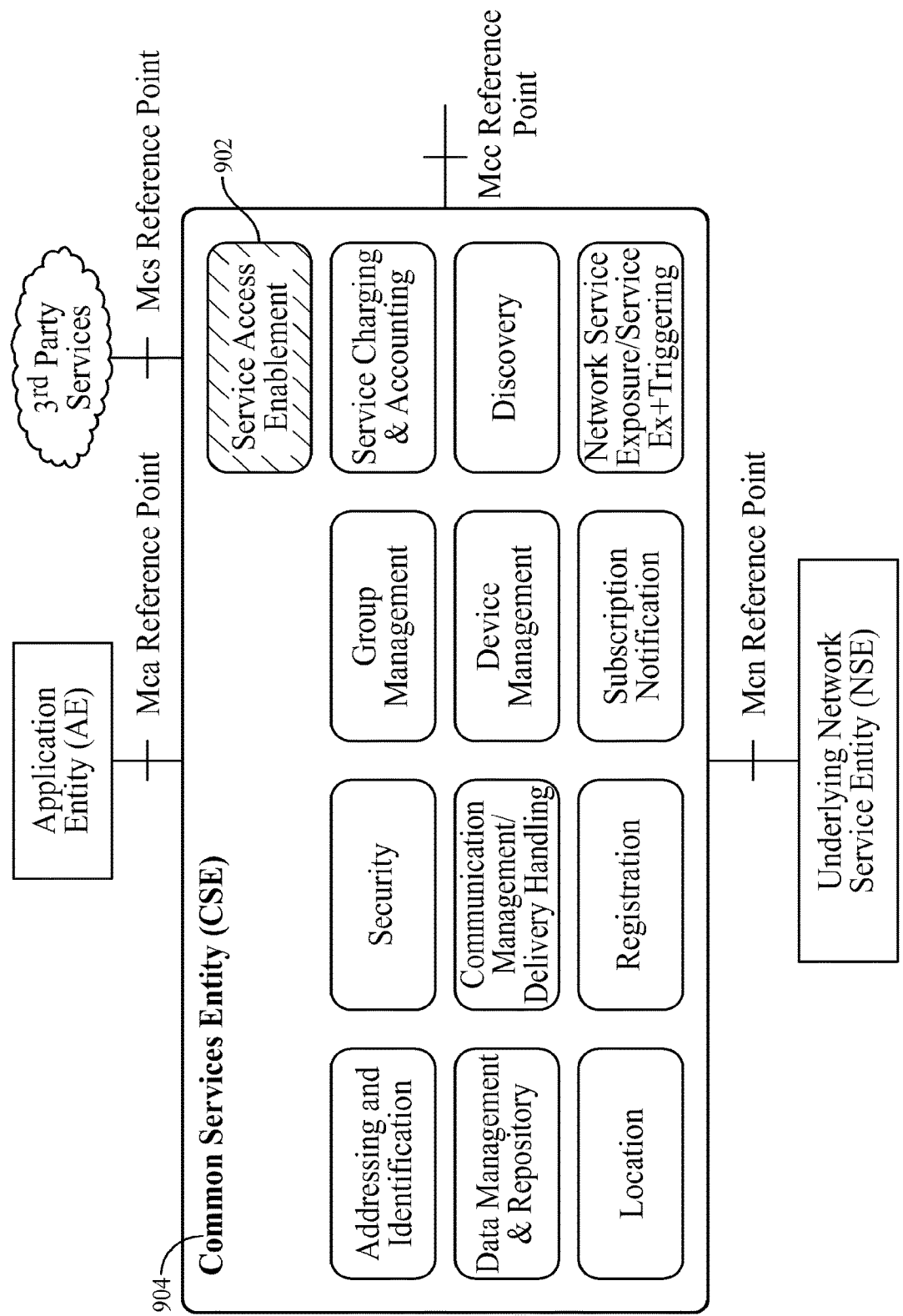
FIG. 9 is a diagram that illustrates a Service Access Enablement (SAE) component.

The functions proposed in this paper can be implemented in a newly defined CSF embodiment as an addition to the existing oneM2M functional architecture. FIG. 9 is a diagram that illustrates the Service Access Enablement (SAE) 902, a new CSF in the CSE 904.

Figure 10:
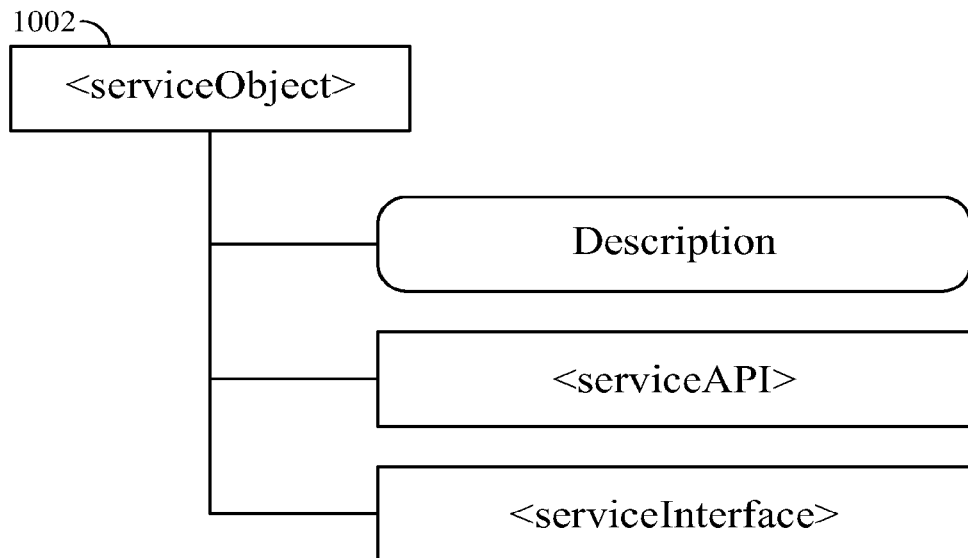
FIG. 10 is a diagram that illustrates a <service object> resource.

FIG. 10 is a diagram that illustrates a <service object> resource 1002. The <service object> resource 1002 represents a container for storing the interface definition to Third Party Services to the oneM2M Service Layer. It is also used to provide a description of the service to Service Layer clients and the interface to setup and access the Third Party Service.

Figure 11:
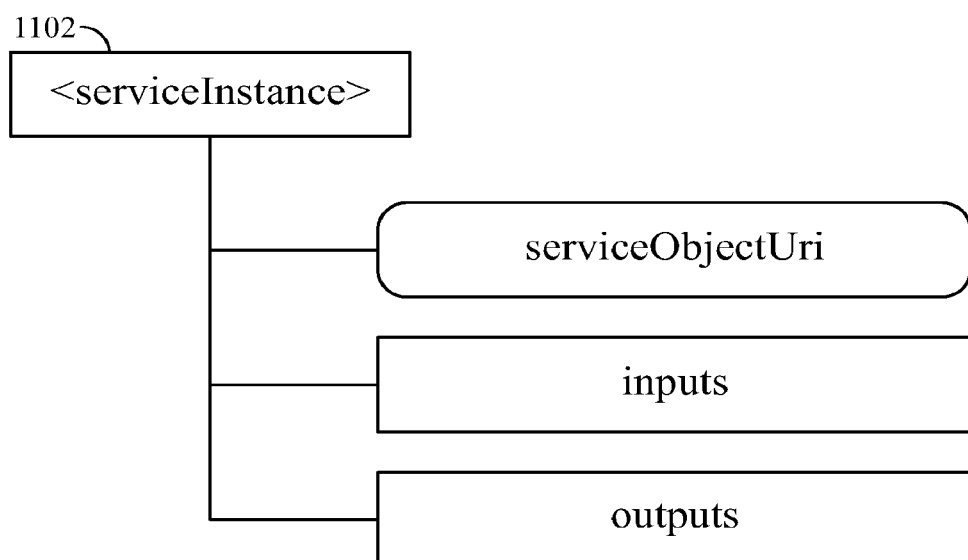
FIG. 11 is a diagram that illustrates a <service instance> object.

FIG. 11 is a diagram that shows a <service instance> object 1102. The <service instance> resource 1102 represents a container for storing the service interface information. This resource is created by Service Layer Clients that want to use a Third Party Service defined in <serviceObject> resources 1102. There is an attribute 1104 that links to the <serviceObject> and attributes for each of the inputs and outputs that have been 'mapped' by the Service Layer. The Service Layer can use these inputs as parameters to the Third Party Service request(s). The Service Layer can also use the outputs specified in this resource for the location to store results of the Third Party Service.

The ideas and procedures discussed above for a oneM2M RoA embodiment may also be implemented in a oneM2M Service Oriented Architecture (SoA).

FIG. 12 is a diagram that illustrates a Service Access Enablement component 1202 within the oneM2M Services Architecture 1200 as well as the definition of a new reference point, Mcs. The resources are similar to those in FIG. 9.

Figure 13A:
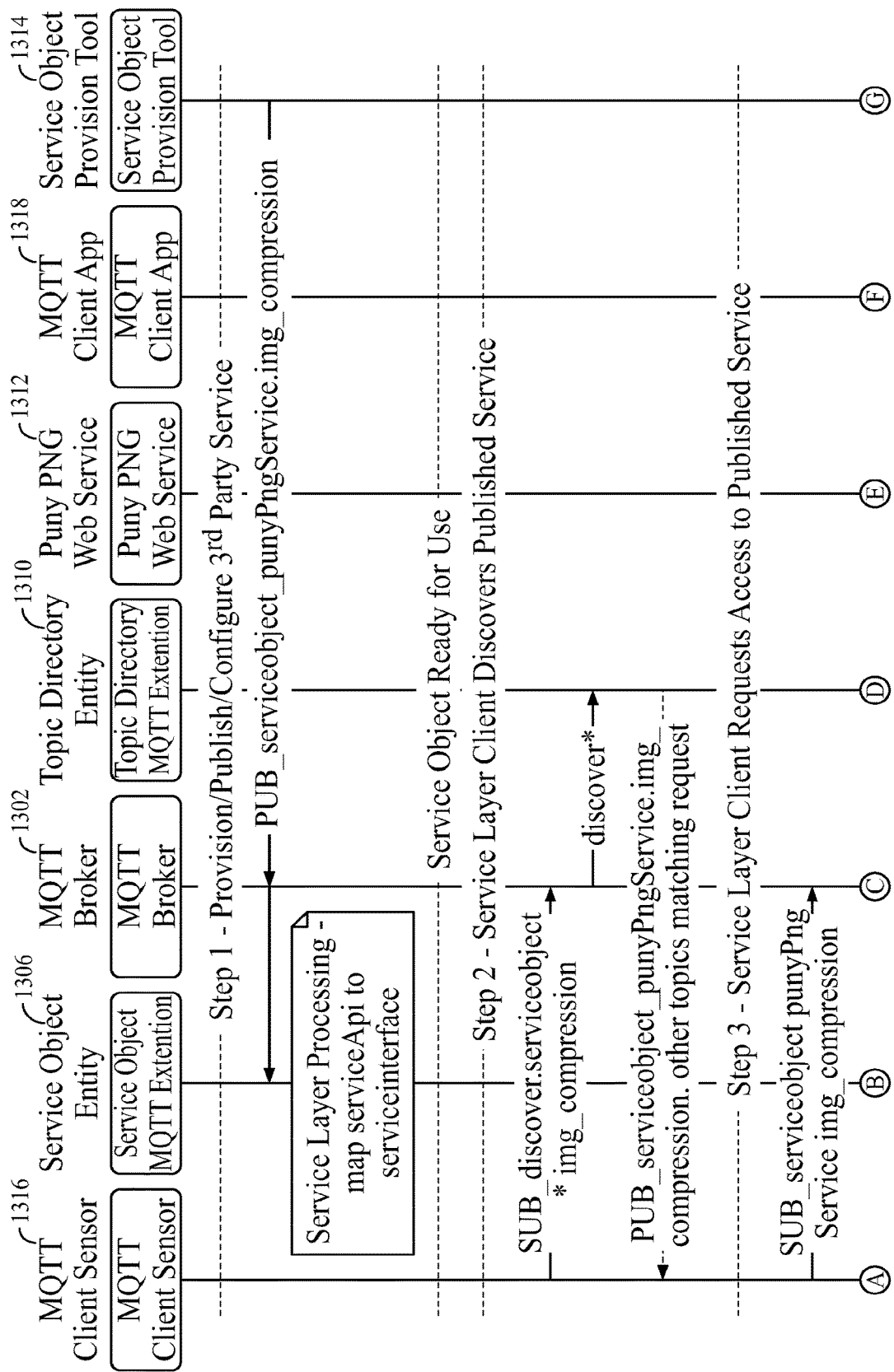
FIGS. 13A, 13B, and 13C together form a flow diagram that illustrates a Message Queue Telemetry Transport (MQTT) Embodiment.
Figure 13B:
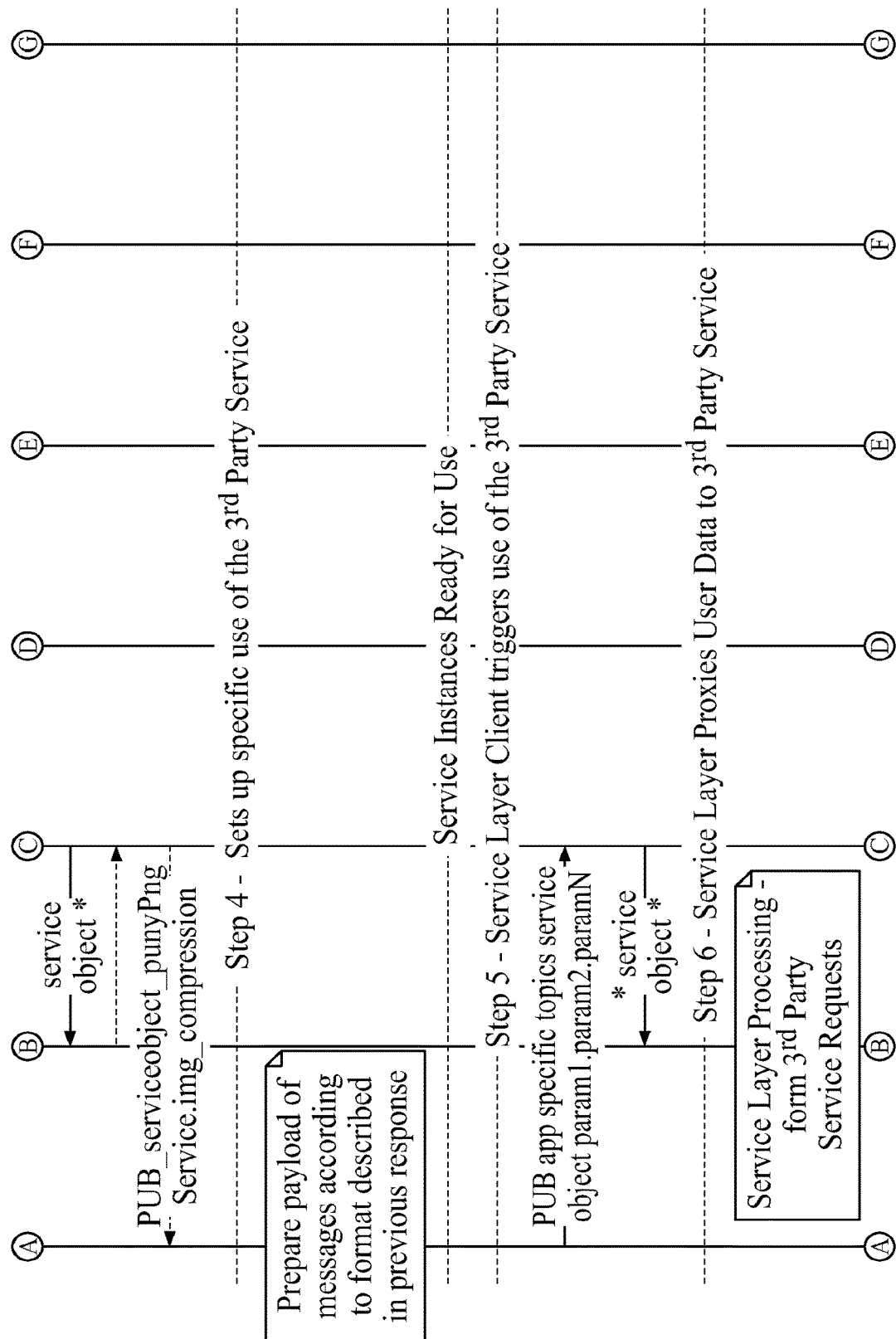
Figure 13C:
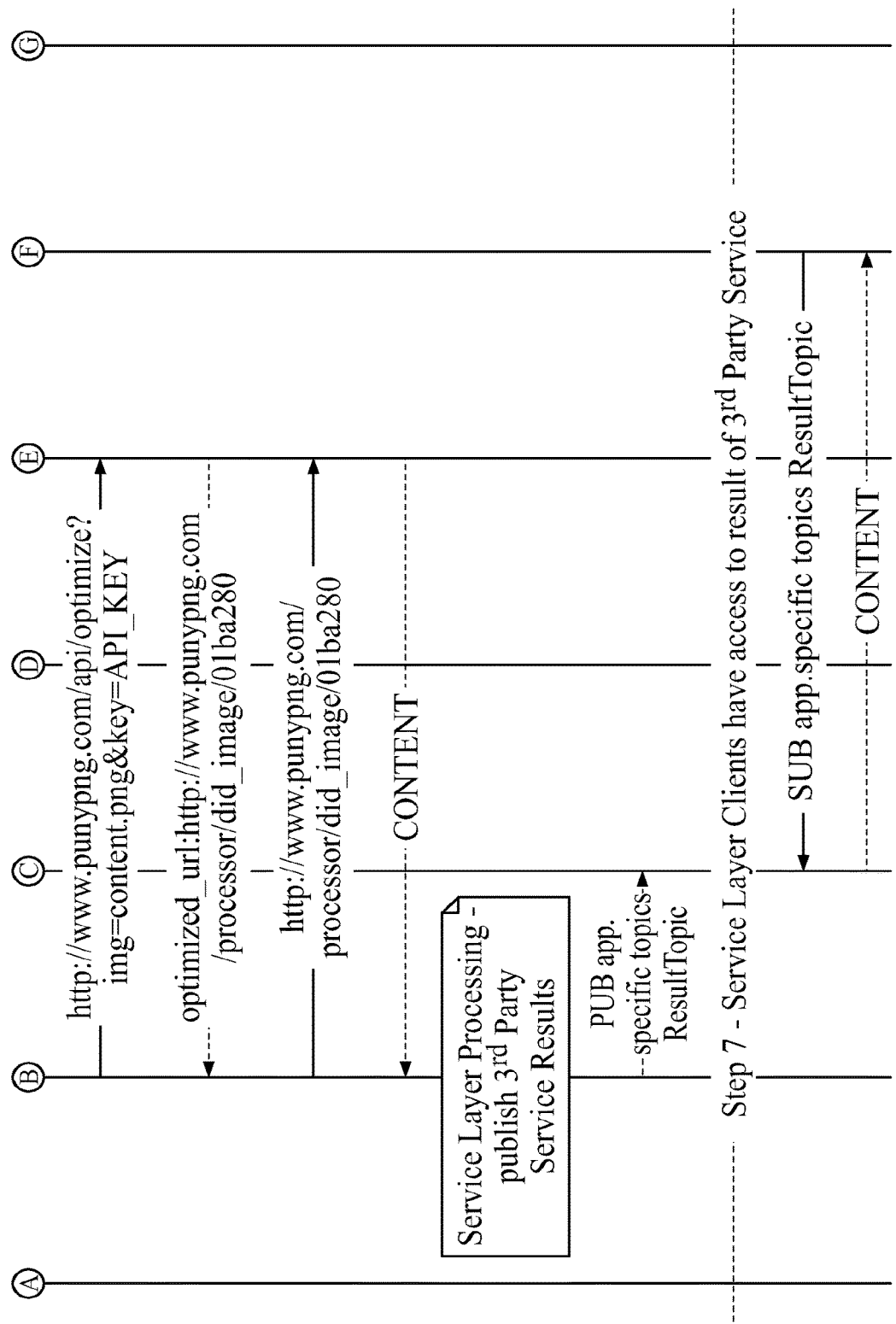

FIG. 13 is a flow diagram of a Message Queue Telemetry Transport (MQTT) Embodiment. MQTT is a publish-subscribe based "light weight" messaging protocol for use on top of the TCPIP protocol. The Publish-Subscribe messaging pattern uses a MQTT broker that is responsible for distributing messages to interested clients based on the topic of a message. This embodiment shows one way that the methods and procedures described in this disclosure can be implemented using a MQTT Architecture. The embodiment is illustrated with the following example scenario.

MQTT Broker 1302 is an instance of an oneM2M Common Services Entity that supports the methods defined in this disclosure and this embodiment.

The basic MQTT protocol support message delivery. MQTT Broker Extensions of the basic protocol requires an implementation that can support custom modifications, such as HiveMQ. A Service Object Extension 1306 is a broker extension that supports receiving a Web Service API and description. Service Object Extension 1306 can receive published messages with a defined topic pattern and perform the Service Layer functions related to the Service Topic Directory Extension 1310 is a broker extension that supports discovery of Service Object topics. This can be generalized to support discovery of other topics as well since that is not a feature of the basic MQTT protocol.

Puny PNG Web Service 1312 is an active web service that provides limited free compress on png formatted images and additional services for a subscription fee. The Puny PNG Web Service 1312 requires the use of an Access Key that you get by creating an account. The Puny PNG Web Service 1312 communicates with the MQTT Broker Service Object extension via protocols native to the Third Party Service.

Service Object Provisioning Tool 1314 is an application that supports sending a Web Service API and description to the MQTT Broker. The Service Object Provisioning Tool 1314 can be a utility for provisioning the Service Object defined in this embodiment. In this embodiment, the discovery of the Puny PNG Web Service occurs out of the scope of this disclosure. It can be a service found via a web search, or it can be a custom implemented service specific to the Application Entities that use this service e.g. the security camera manufacturer can host a web service for only its cameras to access.

MQTT Client Sensor 1316 is a device or application that places images into the MQTT Broker. In this example it performs the service object discovery and setup procedures. This step can have been done by a separate entity, such as a setup application that often accompanies hardware or devices. The MQTT Client Sensor 1316 can be a remote security camera that takes pictures at a configured rate.

MQTT Client App 1318 is an application that subscribes to compressed versions of the images provided by MQTT Client Sensor.

In FIG. 13, the methods and procedures described in this disclosure are shown for the actors using the MQTT Broker 1302.

Step 1 of FIG. 13 is a Provision/Publish/Configure Third Party Service step. The Service Object provisioning tool 1314 creates an instance of the Service Object for the PunyPNG web service 1312. The PUB topic is used by the MQTT broker extension 1306 to identify this as a service object. The message payload includes the Service API information as well as the Service Description information. In this example, Service Credentials are not provisioned to the service layer, which requires Service Layer clients to request their own API_KEY using the Third Party Service defined procedures. This is a deployment decision between the Service Layer and the Third Party Service.

In this embodiment the convention for the topics are: serviceobject<third_party_service_name>.<service_description>. This convention can be different.

---

Method: PUB serviceobject.punyPngServiceObjecting_compression
Payload:
  <service Object id= "punyPngService">
    <description>
      <body>
        <h1>punypng</h1>
        <h2>

-continued

```
        Image Compressor for Designers and Developers
        </h2>
        <h2>Supports: JPG, GIF and PNG. </h2>
        <h2>Go to PunyPNG.com to request an API
        Key</h2>
        </body>
    </description>
    <serviceApi>
        <request>
            http://www.punypng.com/api/optimize?img=image.
            png&key= API KEY
        </request>
        <response>
            {"original size":value, "optimized_size":value, "opti
            mized_url": url, "group _id": null,
            "savings_percent": v
            alue, "savings_bytes":value}
        </response>
        <request>
            "optimized_url":url
        </request>
        <response>
            {Content}
        </response>
    </ serviceApi>
</serviceObject>
```

The MQTT Service Object Extension 1314 intercepts the published messages that match the specified topic convention, in this case all messages containing "serviceobject" in the topic name.

The MQTT Service Object Extension 1314 analyzes and maps the service API provided in the request to payload format and topic naming convention as described in section The mapping process can be done using web service description languages or manual configuration at the service layer. The example Request/Response pairs can generate the following service layer information:

Request 1 url: http://www.punypng.com/api/optimize
Request 1 parameter: img=image.png
Request 1 parameter: key= API KEY
Response 1 parameter: "original_size ":value
Response 1 parameter: "optimized_size ": value
Response 1 parameter: "optimized _url ":url ← This url is used in Request 2
Response 1 parameter: "group_id ":null
Response 1 parameter: 'savings_percent ":value
Response 1 parameter: "savings_bytes ": value
Response 1 parameter: "original size":value
Request 2 url: "optimized url ":url ← This url came from response 1
Response 2: "content": value In this Third Party Service API, there are 2 Request/Response pairs that generate 2 input parameters and 6 output parameters that get mapped to the MQTT topic convention.

At this point the MQTT Service Object extension 1306 has a Service Object instance for this Third Party Service ready for use by Service Layer clients.

In Step 2 of FIG. 13, the Service Layer client discovers the published service. The application discovers Services that perform image compression using the MQTT Topic Discovery extension 1306. The Topic Discovery extension 1306 is triggered by prepending the topic token "discover" to the beginning of the SUB message. The result of the discovery request includes topics of the services that match the desired feature.

The application optionally requests descriptions of the services that are returned. An example description can be displayed in an HTML viewer as:

PunyPNG
Image Compressor for Designers and Developers
Supports: JPG, GIF and PNG.
Max 150 KB each, up to 15 files
Go to PunyPNG.com to request an API Key In step 3 of FIG. 13, the Service Layer Client 1316 requests access to a Published Service. Once the MQTT client 1316 finds a service that meets its needs, the client requests access to the Published Service. In this example embodiment, the Service Layer client 1316 retrieves an interface description that specifies how the Third Party Service can be accessed.

```
<serviceInterface>
    <topics>
        <input Type= "required">serviceobject</input>
        <input Type= "required">punyPngService</input>
        <input Type= "outputSize">param1</input>
        <input Type= "API_KEY">param2</input>
        <input Type= "output topics">*</input>
    </topics>
    <payload>
        <input Type= "png">image</input>
    </payload>
</serviceInterface>
```

In step 4 of FIG. 13, Service Layer Client 1316 sets up usage for the Third Party Service. Using the information from the interface description, the MQTT Client Sensor creates a message that is published to the topics defined in the Service interface. In this example it can be:

serviceobject.punyPngService.256.AKU1FYY1GBDKJRB.myHouse.frontdoor

Where

"serviceobject" and "punyPngService" are two required topics

"256" is the outputsize parameter

"AKUIFYY1GBDKJRB" is the API_KEY parameter

"myHouse.frontdoor" are the output topics

And the payload of this message must be an image in "png" format.

In step 5 of FIG. 13, the Service Layer Client 1316 triggers use of Third Party Service. The MQTT Client Sensor in our example publishes and image according to the format described above.

In step 6 of FIG. 13, Service Layer proxies user data to a Third Party Service. The "serviceobject" topic is used to direct this message to the Service Object Extension. The "punyPngService" topic is used to find the Service Object API for the Third Party Service. The parameters in the rest of the topic name are mapped to the parameters required by the Third Party Service API. The Service Object extension performs the specified sequence of requests and responses using the data provided in the published message. The Service Object publishes the result to the "output topics".

In step 7 of FIG. 13, Service Layer Clients 1616 have access to the result of the Third Party Service. A Client App that wishes to receive these topics can subscribe to "output topics" to receive the compressed images that came from the Third Party Service.

It is understood that the entities performing the steps illustrated in FIG. 13 are logical entities that may be implemented in the form of software (i.e., computer-executable instructions) stored in a memory of, and executing on a processor of, a device, server, or other computer system such as one of those illustrated in FIG. 15C or 15D (our two environment figures). That is, the method(s) illustrated in FIG. 13 may be implemented in the form of software (i.e., computer-executable instructions) stored in a memory of a computing device, such as for example the device or computer system illustrated in FIG. 15C or 15D, which computer executable instructions, when executed by a processor of the computing device, perform the steps illustrated in FIG. 13.

Interfaces, such as Graphical User Interfaces (GUIs), can be used to assist user to control and/or configure functionalities related to enabling access to third party services via the service layer. GUIs can support third party services defining how to specify the API of the third party service in the corresponding M2M SL native protocol, support discovery of third party services, provide descriptions of the services, and allow for requests for access to the services. FIG. 14 is a diagram that illustrates exemplary interfaces 1402, 1404 and 1406. Interface 1402 allows for users to input a description or additional information about a provided service. Interface 1404 allows a user to input a request API and indicate an expected response. Interface 1406 allows for a search for third party services. It is to be understood that interfaces 1402, 1404 and 1406 can be produced using displays such as those shown in FIGS. 15C-D described below.

Example M2M/IoT/WoT Communication System

FIG. 15A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406.

As shown in FIG. 15A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 15A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 15B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406. The M2M service layer 22 may be implemented by one or more servers, computers, devices, virtual machines (e.g. cloud/storage farms, etc.) or the like, including for example the devices illustrated in FIGS. 15C and 15D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain.

M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 15B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406 may be hosted within a M2M service layer instance hosted by an M2M node, such as an M2M server, M2M gateway, or M2M device, as shown in FIG. 15B. For example, the logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 15C or FIG. 15D described below.

Further, logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406 can implemented as part of an M2M network that uses a Service Oriented Architecture (SOA) and/or a Resource-Oriented Architecture (ROA) to access services of the present application.

FIG. 15C is a block diagram of an example hardware/software architecture of a M2M network node 30, such as an M2M device 18, an M2M gateway 14, an M2M server, or the like. The node 30 can execute or include logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406. The device 30 can be part of an M2M network as shown in FIG. 15A-B or part of a non-M2M network. As shown in FIG. 15C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (TC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 15C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 15C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 15C as a single element, the M2M node 30 may include any number of transmit/receive elements 36. More specifically, the M2M node 30 may employ MTMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATS, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 15D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCT (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 15A and FIG. 15B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as external services 606, logical entities for sensor 602, M2M service layer 604, application 608, CSE 806, web service 804 and 1312, oneM2M service object provisioning tool 802, Service Access Enablement 902, Service Component Service Access Enablement 1202, MQTT client sensor 1316, Service Object MQTT extension 1306, MQTT broker 1302, topic directory MQTT extension 1310, MQTT client application 1318, and service object provisioning tool 1314 as well as logical entities to produce interfaces such as interfaces 1402, 1404 and 1406 may be embodied in the form of the computer executable instructions stored on a computer-readable storage medium. Computer readable storage media include both volatile and nonvolatile, removable and non-removable media implemented in any non-transitory (i.e., tangible or physical)

method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A node comprising a processor and a memory, the node further including computer-executable instructions stored in the memory of the node which, when executed by the processor of the node, cause the node to:
    create a resource within a service of the node, wherein the resource is a uniquely addressable element in a Resource Oriented Architecture (ROA) having a representation that can be manipulated via RESTful methods, wherein the service supports service capabilities through a set of Application Programming Interfaces (APIs) and wherein the resource represents an external service outside of the service and determines a mapping of one or more parameters of the resource to an Application Programming Interface (API) associated with the external service;
    receive, from an application based on a protocol associated with the service, a discovery request;
    send, to the application based on the protocol associated with the service, a discovery result comprising one or more URIs of one or more resources representing the external service based on one or more features indicated by the discovery request;
    receive, from the application and based on the protocol associated with the service, a first request associated with the resource;
    send, to the external service via the API of the external service, one or more second requests, the one or more second requests being generated from the first request based on the mapping,
    wherein the external service is provided to the application via the resource so that requests associated with the application can be communicated via the service;
    receive, from the external service via the API of the external service, one or more first responses to the one or more second requests; and
    send, to the application, a second response to the first request, wherein the response is based on the protocol associated with the service and comprises information from the one or more first responses received to the second requests.

2. The node of claim 1, wherein the service is provided as a middleware service in a service layer located on top of network protocol stacks for IoT services.

3. The node of claim 2, wherein the service layer is defined according to ETSI/oneM2M standards.

4. The node of claim 1, wherein the resource is accessed by the application via one or more protocols of the service.

5. The node of claim 1, wherein the node proxies data to the external service from the service for the application.

6. The node of claim 1, wherein the node receives results from the external service at the service and makes the results available to the application via the service resource.

7. The node of claim 1, wherein the API comprises input parameters and output parameters.

8. The node of claim 7, wherein the API further comprises access credentials.

9. The node of claim 1, wherein the discovery result identifies one or more topics that match the one or more features indicated by the discovery request.

10. A method comprising:
    creating a resource within a service of a node, wherein the resource is a uniquely addressable element in a Resource Oriented Architecture (ROA) having a representation that can be manipulated via RESTful methods, wherein the service supports service capabilities through a set of Application Programming Interfaces (APIs) and wherein the resource represents an external service outside of the service and determines a mapping of one or more parameters of the resource to an Application Programming Interface (API) associated with the external service, the API comprises input parameters, output parameters and access credentials;
    receive, from an application based on a protocol associated with the service, a discovery request;
    send, to the application based on the protocol associated with the service, a discovery result identifying one or more resources representing the external service based on one or more features indicated by the discovery request;
    receiving, from the application and based on the protocol associated with the service, a first request associated with the resource;
    sending, to the external service via the API of the external service, one or more second requests, the one or more second requests being generated from the first request based on the mapping,
    wherein the external service is provided to the application via the resource so that requests associated with the application can be communicated via the service;
    receiving, from the external service via the API of the external service, one or more first responses to the one or more second requests; and
    sending, to the application, a second response to the first request, wherein the response is based on the protocol associated with the service and comprises information from the one or more first responses received to the second requests.

11. The method of claim 10, wherein the service is provided as a middleware service in a service layer located on top of network protocol stacks for IoT services.

12. The method of claim 11, wherein the service layer is defined according to ETSI/oneM2M standards.

13. The method of claim 10, wherein the resource is accessed by the application via one or more protocols of the service.

14. The method of claim 10, further comprising:
   proxying data to the external service from the service for the application.

15. The method of claim 10, further comprising:
   receiving results from the external service at the service; and
   making the results available to the application via the resource.

16. The method of claim 10, wherein the API comprises input parameters and output parameters.

17. The method of claim 16, wherein the API further comprises access credentials.

18. The method of claim 10, wherein the discovery result identifies one or more topics that match the one or more features indicated by the discovery request.

\* \* \* \* \*